(12) United States Patent
Chung

(10) Patent No.: US 7,546,438 B2
(45) Date of Patent: Jun. 9, 2009

(54) ALGORITHM MAPPING, SPECIALIZED INSTRUCTIONS AND ARCHITECTURE FEATURES FOR SMART MEMORY COMPUTING

(76) Inventor: Shine C. Chung, 5988 Porto Alegre Dr., San Jose, CA (US) 95120

( * ) Notice: Subject to any disclaimer, the term of this patent is extended or adjusted under 35 U.S.C. 154(b) by 332 days.

(21) Appl. No.: 11/175,559

(22) Filed: Jul. 5, 2005

(65) Prior Publication Data

US 2005/0246698 A1    Nov. 3, 2005

Related U.S. Application Data

(63) Continuation-in-part of application No. 10/199,745, filed on Jul. 19, 2002, now Pat. No. 6,970,988, which is a continuation-in-part of application No. 10/099,440, filed on Mar. 14, 2002, now Pat. No. 6,807,614.

(60) Provisional application No. 60/306,636, filed on Jul. 19, 2001, provisional application No. 60/341,411, filed on Dec. 17, 2001.

(51) Int. Cl.
*G06F 9/45* (2006.01)
(52) U.S. Cl. ............... 711/202; 711/201; 715/247; 715/263; 715/771; 717/109; 717/149
(58) Field of Classification Search ............ 717/109, 717/149; 711/202
See application file for complete search history.

(56) References Cited

U.S. PATENT DOCUMENTS

| | | | |
|---|---|---|---|
| 4,823,257 A | 4/1989 | Tonomura | |
| 4,873,630 A | 10/1989 | Rusterholz et al. | |
| 5,226,171 A | 7/1993 | Hall et al. | |
| 5,301,340 A | 4/1994 | Cook | |
| 5,396,641 A | 3/1995 | Lobst et al. | |
| 5,678,021 A | 10/1997 | Pawate et al. | |
| 5,983,004 A | 11/1999 | Shaw et al. | |
| 6,292,903 B1 | 9/2001 | Coteus et al. | |
| 6,741,616 B1 | 5/2004 | Sutherland et al. | |
| 6,807,614 B2 | 10/2004 | Chung | |
| 7,159,185 B1 * | 1/2007 | Vedula et al. ........ | 715/763 |

OTHER PUBLICATIONS

Andrew S. Tanenbaum, Structured Computer Organization, 1990, Prentice-Hall, Inc., Third Edition, pp. 11-13.*
Shine C. Chung, U.S. Appl. No. 10/199,745, filed Jul. 19, 2002.

* cited by examiner

*Primary Examiner*—Hetul Patel

(57) ABSTRACT

A smart memory computing system that uses smart memory for massive data storage as well as for massive parallel execution is disclosed. The data stored in the smart memory can be accessed just like the conventional main memory, but the smart memory also has many execution units to process data in situ. The smart memory computing system offers improved performance and reduced costs for those programs having massive data-level parallelism. This smart memory computing system is able to take advantage of data-level parallelism to improve execution speed by, for example, use of inventive aspects such as algorithm mapping, compiler techniques, architecture features, and specialized instruction sets.

9 Claims, 29 Drawing Sheets

$\nabla^2 \Phi = \rho/\varepsilon$ $((\Phi_{i+1,j}+\Phi_{i-1,j}+\Phi_{i,j+1}+\Phi_{i,j-1})-4\Phi_{i,j})/(h^2) = \rho_{i,j}/\varepsilon \quad i=1,..,N-1, j=1,..,M-1$ $\Phi_{i,j} = (\Phi_{i+1,j}+\Phi_{i-1,j}+\Phi_{i,j+1}+\Phi_{i,j-1})/4 - (h^2/4)\rho_{i,j}/\varepsilon \quad i=1,..,N-1, j=1,..,M-1$

|   | //(i,j)=(1,1) | (i,j)=(1,3) | (i,j)=(1,4) | (i,j)=(1,5) |
|---|---|---|---|---|
| 1 | Load M[A1,1a],DAR.1 | Load M[A1,3a],DAR.3 | Load M[A1,4a],DAR.4 | Load M[A1,5a],DAR.5 |
|   | (coeff=1 pass=1) | (coeff=2 pass=1) | (coeff=0, pass=0) | (coeff=0, pass=2) |
| 2 | Load M[A1,1],DPR | Load M[A1,3],DPR | Load M[A1,4],DPR | Load M[A1,5],DPR |
| 3 | Store 0->PASSR  // | // to proc. Von Neuman | boundary condion for | point (1,4) |
|   | ..... | ..... | .... | ..... |
|   | (no op) | (no op) | (proc. VN boundary) | (no op) |
|   | ..... | ..... | ..... |   |
| 20 | STORE 1->PASSR | // to process electrical | field in dielectric | For (1,1) and (1,3) |
| 21 | Load M[A0,1],R1.1 | Load M[A0,3],R3.1 | Load M[A0,4],R4.1 | Load M[A0,5],R5.1 |
| 22 | Load M[A1,0],R1.2 | Load M[A1,2],R3.2 | Load M[A1,3],R4.2 | Load M[A1,4],R5.2 |
| 23 | Load M[A1,2],R1.3 | Load M[A1,4],R3.3 | Load M[A1,5],R4.3 | Load M[A1,6],R5.3 |
| 24 | Load M[A2,1],R1.4 | Load M[A2,3],R3.4 | Load M[A2,4],R4.4 | Load M[A2,5],R5.4 |
| 25 | Add R1.1,R1.2, R1.5 | Add R3.1,R3.2, R3.5 | Add R4.1,R4.2, R4.5 | Add R5.1,R5.2, R5.5 |
| 26 | Add R1.5,R1.3, R1.6 | Add R3.5,R3.3, R3.6 | Add R4.5,R4.3, R4.6 | Add R5.5,R5.3, R5.6 |
| 27 | Add R1.6,R1.4, R1.7 | Add R3.6,R3.4, R3.7 | Add R4.6,R4.4, R4.7 | Add R5.6,R5.4, R5.7 |
| 28 | Div R1.7, 4, R1.8 | Div R3.7, 4, R3.8 | Div R4.7, 4, R4.8 | Div R5.7, 4, R5.8 |
| 29 | Load M[$\rho$1,1],R1.9 | Load M[$\rho$1,3],R3.9 | Load M[$\rho$1,4],R4.9 | Load M[$\rho$1,5],R5.9 |
| 30 | Div R1.9,coef,R1.9 | Div R3.9,coef,R3.9 | Div R4.9,coef,R4.9 | Div R5.9,coef,R5.9 |
| 31 | Sub,f R1.8,R1.9,R1.8 | Sub,f R3.8,R3.9,R3.8 | Sub,f R4.8,R4.9,R4.8 | Sub,f R5.8,R5.9,R5.8 |
| 32 | Store R1.8,M[A1,1] | Store R3.8,M[A1,3] | Store R4.8,M[A1,4] | Store R5.8,M[A1,5] |
|   |   |   | ( no op) | (no op) |
| 33 | STORE 2->PASSR | // to process electrical | field in N+-type semi | for point (1,5) |
|   | ..... | ..... | .... | ..... |
|   | (no op) | (no op) | (no op) | (proc. N+ type semi) |
|   | ..... | ..... | ..... | ..... |

Fig. 9(b)

ADD  R0.3, R1.5, R1.6

ADD  R2.3, R1.5, R1.6

ADD,W R2.3, R1.5, R1.6

ADD,L R0.3, R1.5, R1.6

ADD,R RR.3, R1.5, R1.6

ADD,C R1.5, R1.6

BUF R1.3, R2.5

SORT R1.3, R2.5

ALGORITHM MAPPING, SPECIALIZED INSTRUCTIONS AND ARCHITECTURE FEATURES FOR SMART MEMORY COMPUTING

CROSS-REFERENCE TO RELATED APPLICATIONS

This application is a continuation-in-part application of U.S. patent application Ser. No. 10/199,745, filed Jul. 19, 2002, now U.S. Pat. No. 6,970,988 and entitled "ALGORITHM MAPPING, SPECIALIZED INSTRUCTIONS AND ARCHITECTURE FEATURES FOR SMART MEMORY COMPUTING," which is hereby incorporated herein by reference, which is a continuation-in-part application of U.S. patent application Ser. No. 10/099,440, filed Mar. 14, 2002, and entitled "Method and Apparatus of Using Smart Memories in Computing System," now U.S. Pat. No. 6,807,614, which is hereby incorporated herein by reference, and which claimed priority benefit of U.S. Provisional Patent Application No. 60/306,636 and U.S. Provisional Patent Application No. 60/341,411, filed Dec. 17, 2001, which are both also hereby incorporated herein by reference. U.S. patent application Ser. No. 10/199,745 also claims the benefit of U.S. Provisional Patent Application No. 60/306,636, filed Jul. 19, 2001 and entitled "Method and Apparatus of Using Smart Memories in Computing System," which is hereby incorporated herein by reference.

BACKGROUND OF THE INVENTION

1. Field of the Invention

The present invention relates to a computing system and, more particularly, to a computing system that uses computing processors residing in data storage devices to process data in a highly parallel fashion.

2. Description of the Related Art

A computing system generally includes a Central Processing Unit (CPU), a cache, a main memory, a chip set, and a peripheral. The computing system normally receives data input from the peripheral and supplies the data to the CPU where the data is to be processed. The processed data can then be stored back to the peripheral. The CPU can, for example, be an Arithmetic Logic Unit (ALU), a floating-point processor, a Single-Instruction-Multiple-Data execution (SIMD) unit, or a special functional unit. The peripheral can be a memory peripheral, such as a hard disk drive or any nonvolatile massive data storage device to provide mass data storage, or an I/O peripheral device, such as a printer or graphics sub-system, to provide I/O capabilities. The main memory provides less data storage than the hard drive peripheral but at a faster access time. The cache provides even lesser data storage capability than the main memory, but at a much faster access time. The chip set contains supporting chips for said computing system and, in effect, expands the small number of I/O pins with which the CPU can communicate with many peripherals.

FIG. 1 illustrates a conventional system architecture of a general computing system. In FIG. 1, block 10 is a CPU. Block 11 is a cache that has a dedicated high speed bus connecting to CPU for high performance. Block 12 is a chip set to connect CPU with main memory 13 and a fast peripheral 14 such as a graphics subsystem. Block 15 is another chip set to expand the bus, such as RS-232 or parallel port for slower peripherals. Note that the components discussed above are very general building blocks of a computing system. Those skilled in the art understand that a computing system may have different configurations and building blocks beyond these general building blocks.

An execution model indicates how a computing system works. FIG. 2 illustrates an execution model of a typical scalar computing system. Between a CPU 10 and a hard disk 17, there are many different levels of data storage devices such as main memory 13, a cache 11, and register 16. The farther the memory devices are positioned from the CPU 10, the more capacity and the slower speed the memory devices have. The CPU 10 fetches data from the hard disk 17, processes the data to obtain resulting data, and stores the resulting data into the various intermediate data storage devices, such as the main memory 13, the cache 11 or the register 16, depending on how often they will be used and how long they will be used. Each level of storage is a superset of the smaller and faster devices nearer to the CPU 10. The efficiency of this buffering scheme depends on the temporal and spatial localities. The temporal locality means the data accessed now are very likely to be accessed later. The spatial locality means the data accessed now are very likely to be accessed in the same neighborhood later. In today's technology, the CPU 10, the register 16, and two levels of cache 11 are integrated into a monolithic integrated circuit.

FIG. 3 shows an execution model of a vector computer. A vector computer has an array of vector CPUs 210, an array of vector registers 216, a main memory 13, and a hard drive 17. The size of the vector array is usually a power of 2, such as 16 or 32, for example. The vector CPUs 210 fetch the data from the hard drive 17 through the main memory 13 to the vector registers 216 and then process an array of the data at the same time. Hence, the processing speed by the vector computer can be improved by a factor equal to the size of the array. Note that a vector computer can also have a scalar unit, such as the computer system described in FIG. 2, as well as many vector units such as those described in FIG. 3. Some vector computers also make use of caches.

A vector computer is able to exploit data parallelism to speed up those special applications that can be vectorized. However, vector computers replicate many expensive hardware components such as vector CPUs and vector register files to achieve high performance. Moreover, vector computers require very high data bandwidth in order to support the vector CPUs. The end result is a very expensive, bulky and power hungry computing system.

In recent years, logic has been embedded into memories to provide a special purpose computing system to perform specific processing. Memories that include processing capabilities are sometimes referred to as "smart memory" or intelligent RAM. Research on embedding logic into memories has led to some technical publications, namely: (1) Duncan G, Elliott, "Computational RAM: A Memory-SIMD Hybrid and its Application to DSP," Custom Integrated Circuit Conference, Session 30.6, 1992, which describes simply a memory chip integrating bit-serial processors without any system architecture considerations; (2) Andreas Schilling et al., "Texram: A Smart Memory for Texturing," Proceedings of the Sixth International Symposium on High Performance Computer Architecture, IEEE, 1996, which describes a special purpose smart memory for texture mapping used in a graphics subsystem; (3) Stylianos Perissakis et al., "Scalable Processors to 1 Billion Transistors and Beyond: IRAM," IEEE Computer, September 1997, pp. 75-78, which is simply a highly integrated version of a vector computer without any enhancement in architecture level; (4) Mark Horowitz et al., "Smart Memories: A Modular Configurable Architecture," International Symposium of Computer Architecture, June 2000, which describes a project to try to integrate general purpose multi-processors and multi-threads on the same integrated circuit chip; and (5) Lewis Tucker, "Architecture and Applications of the Connection Machines," IEEE Computer, 1988, pp. 26-28, which used massively distributed array processors connected by many processors, memories, and routers among them. The granularity of the memory size, the bit-serial processors, and the I/O capability is so fine that these processors end up spending more time to communicate than to process data.

Accordingly, there is a need for computing systems with improved efficiency and reduced costs as compared to conventional vector computers.

SUMMARY OF THE INVENTION

The invention pertains to a smart memory computing system that uses smart memory for massive data storage as well as for massive parallel execution. The data stored in the smart memory can be accessed just like the conventional main memory, but the smart memory also has many execution units to process data in situ. The smart memory computing system offers improved performance and reduced costs for those programs having massive data-level parallelism. This invention is able to take advantage of data-level parallelism to improve execution speed by, for example, use of inventive aspects such as algorithm mapping, compiler techniques, architecture features, and specialized instruction sets.

The invention can be implemented in numerous ways including, a method, system, device, data structure, and computer readable medium. Several embodiments of the invention are discussed below.

As a smart memory computing system, one embodiment of the invention includes at least: a user space wherein data within has data-level parallelism; a smart memory space wherein data within can be processed in parallel and in situ; a graphical user representation describing data in said user space and interactions therewith; and a compiler mapping data from said user space to said smart memory space and generating executable codes in accordance with the graphical user representation.

As a data structure for storing data, variables and attributes for use in a smart memory computing system, one embodiment of the invention includes at least: a previous data field that stores a prior data; a current data field that stores a current data; a variable field that stores at least one fixed variable; and an attributes field. The attributes field stores a plurality of attributes, such as a filler field, a pass field, and a coefficient field. Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 9(b): shows a portion of parallel code to illustrate how the instructions work with architecture features.

DETAILED DESCRIPTION OF THE INVENTION

The invention pertains to a smart memory computing system that uses smart memory for massive data storage as well as for massive parallel execution. The data stored in the smart memory can be accessed just like the conventional main memory, but the smart memory also has many execution units to process data in situ. The smart memory computing system offers improved performance and reduced costs for those programs having massive data-level parallelism. This invention is able to take advantage of data-level parallelism to improve execution speed by, for example, use of inventive aspects such as algorithm mapping, compiler techniques, architecture features, and specialized instruction sets.

Figure 1:
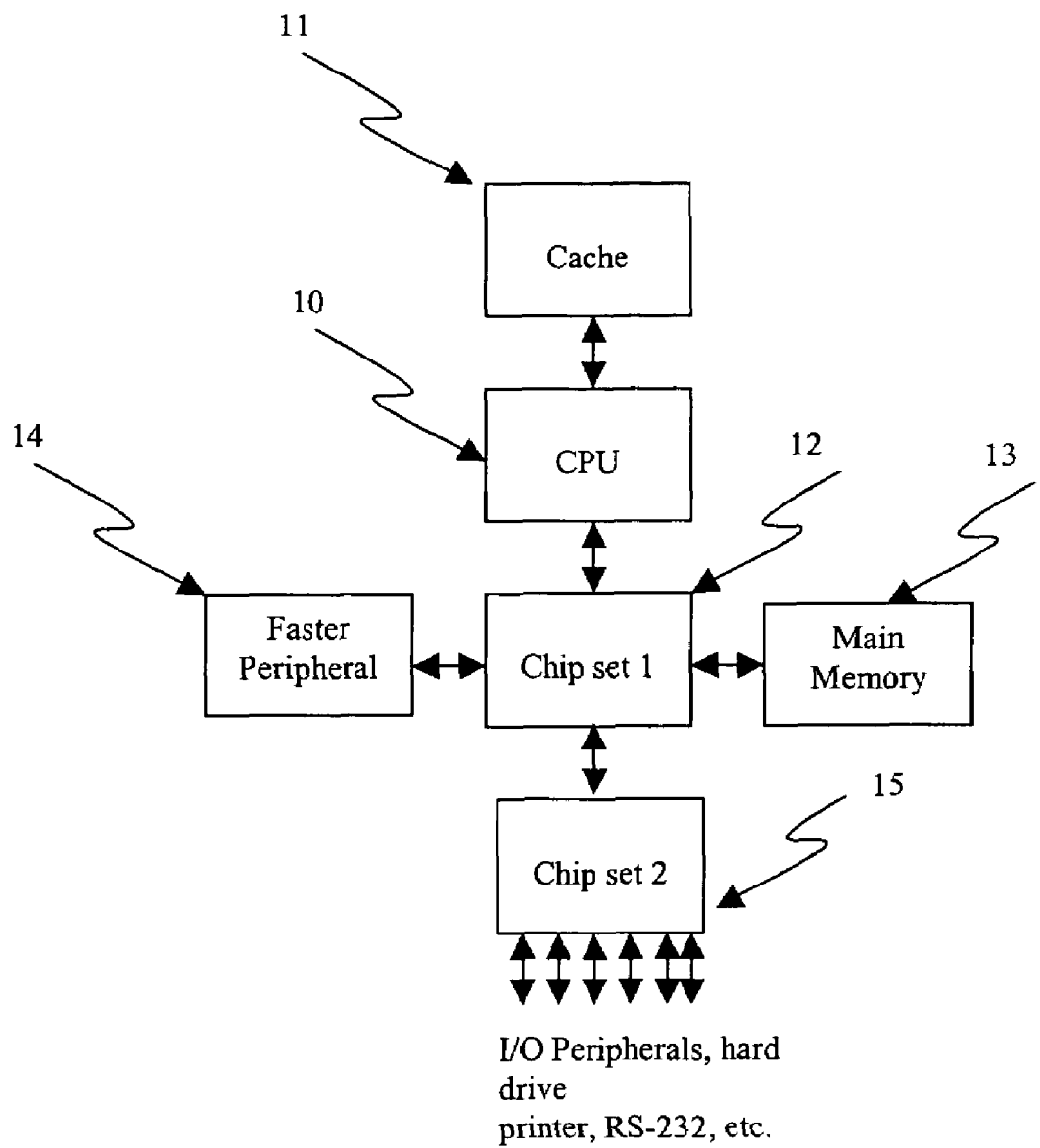
FIG. 1 shows the system architecture of a prior art computing system.
Figure 2:
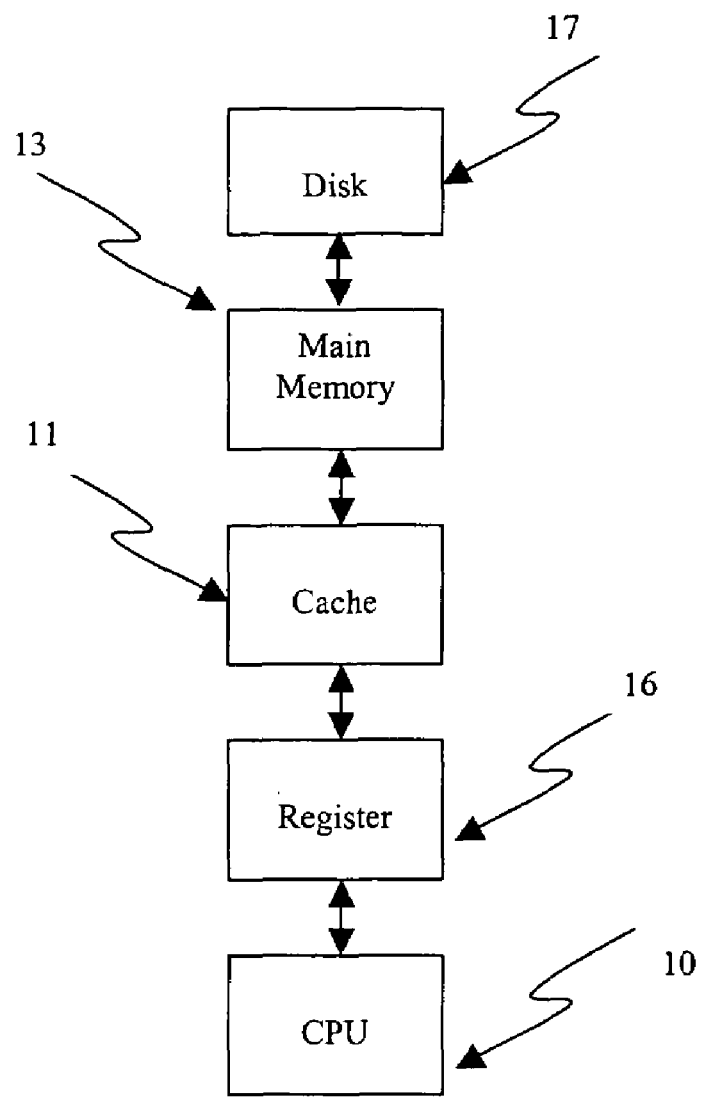
FIG. 2 shows the execution model of a scalar computing system.
Figure 3:
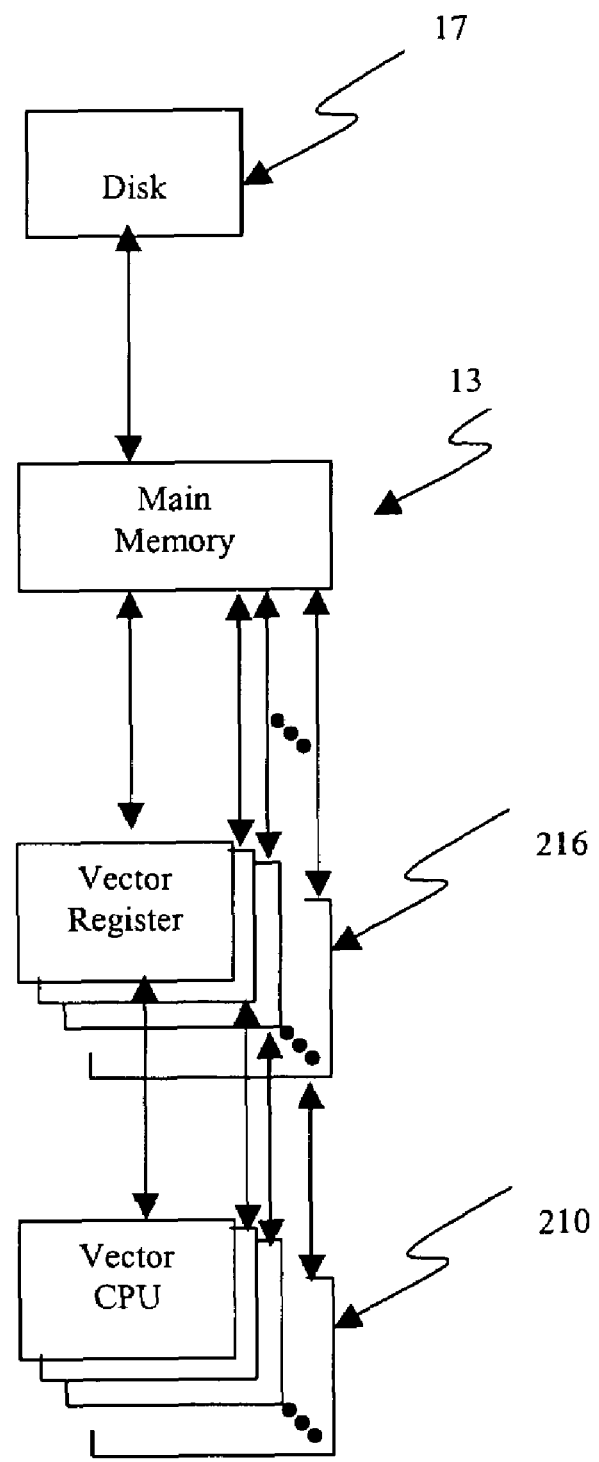
FIG. 3 shows the execution model of a vector computing system.
Figure 3A:
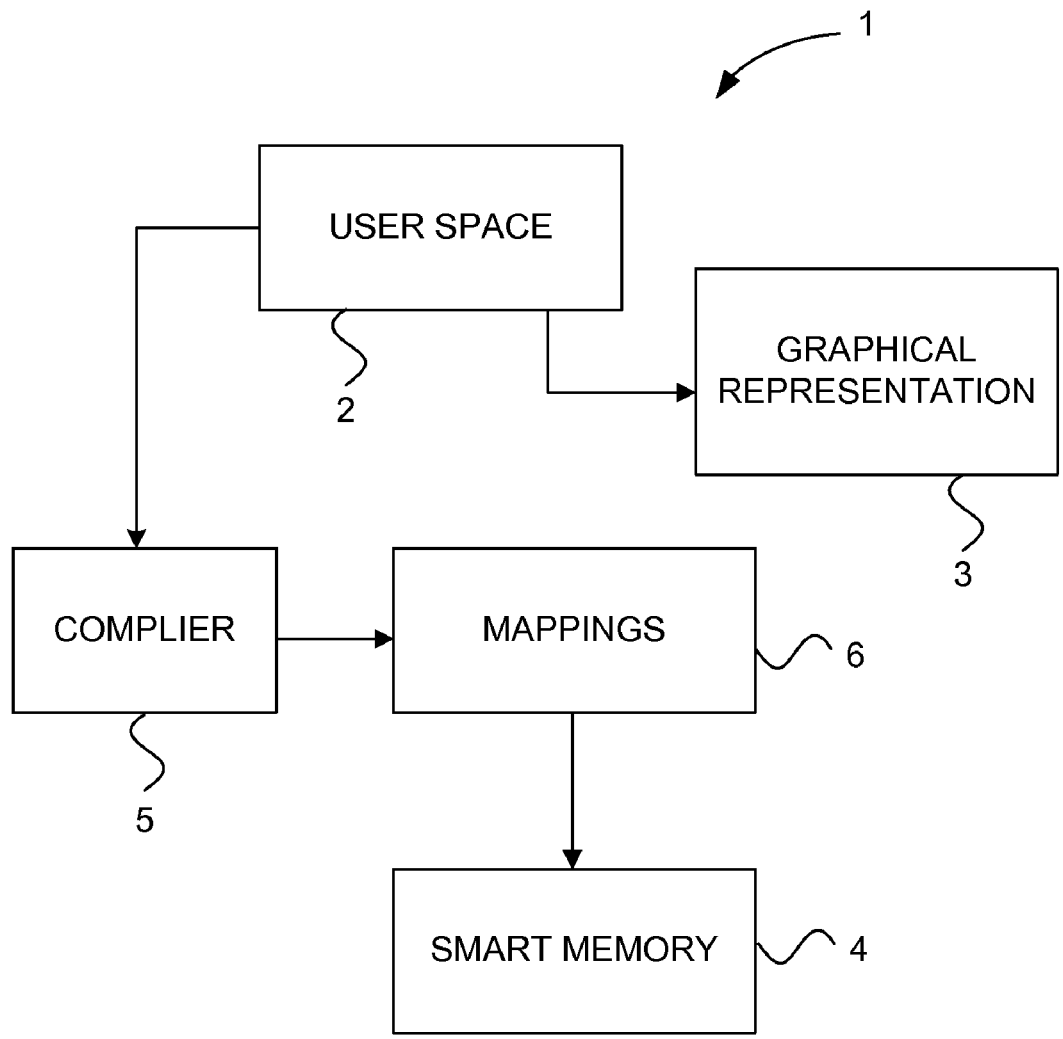
FIG. 3A is a block diagram of a smart memory computing system according to one embodiment of the invention.

FIG. 3A is a block diagram of a smart memory computing system 1 according to one embodiment of the invention. The smart memory computing system 1 includes a user space 2 that stores data having data-level parallelism, and a graphical representation 3 describing the data in the user space 2 and interactions therewith. The smart memory computing system 1 also includes a smart memory 4, a complier 5 and mappings 6. The smart memory 4 has multiple execution units that can process the data in parallel and in situ. The compiler 5 can map data from the user space 2 to the smart memory 4 and generate executable codes in accordance with the graphical representation 3.

I. Algorithm Mapping

Smart memory computing is most suitable to solve problems using massive data-level parallelism in fine grain. The 2D or 3D computational fluid dynamics, electromagnetic field, encryption/decryption, image processing, and sparse matrices are some of the examples.

Figure 4:
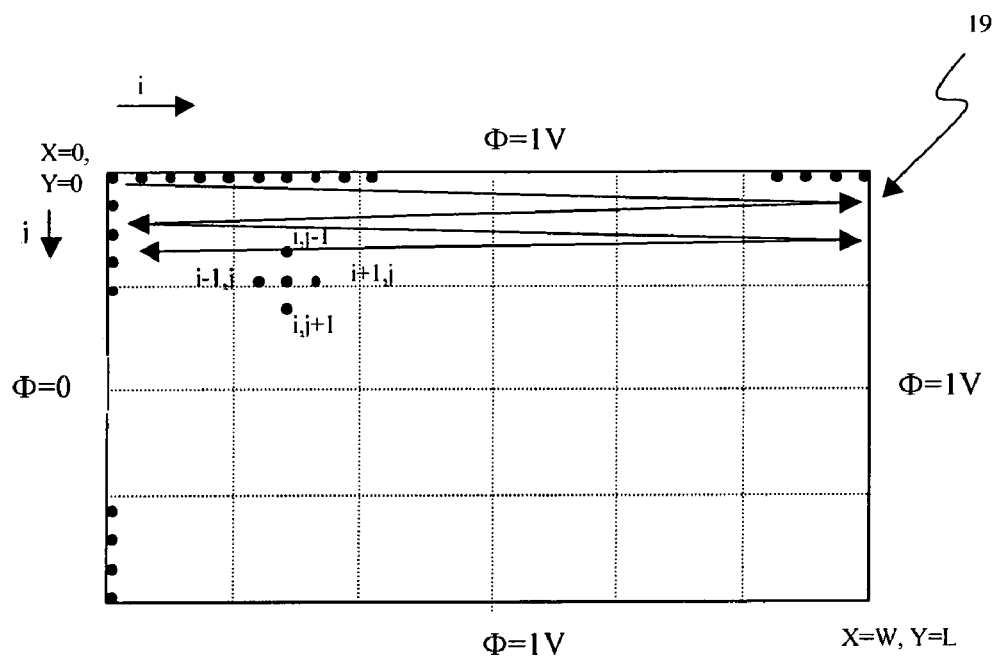
FIG. 4 shows an iterative algorithm for the conventional computers to solve 2D Poisson's equation.

FIG. 4 shows a representative user space for a 2D Poisson's equation $\nabla^2\Phi=\rho/\in$ according to one embodiment of the invention. Block 19 represents the user data space of interest. There are many ways to solve the Poisson's equation in numerical methods. The most straight-forward method is the finite difference method. This method solves partial differential equations of a rectangle with length L and width W by approximating the continuum in the user space with discrete data points in a mesh and approximating the differential equations with simultaneously finite difference equations as follows:

$$((\Phi_{i+1,j}+\Phi_{i-1,j}+\Phi_{i,j+1}+\Phi_{i,j-1})-4\Phi_{i,j})/(h^2)=\rho_{i,j}/\in$$
$$i=1,\ldots,N-1, j=1,\ldots,M-1$$

or $\Phi_{i,j}=(\Phi_{i+1,j}+\Phi_{i-1,j}+\Phi_{i,j+1}+\Phi_{i,j-1})/4-(h^2/4)\rho_{i,j}/\in$
$i=1,\ldots,N-1, j=1,\ldots,M-1$ (Eq. 1.1), where h=W/N=L/M.

The simultaneous equations Eq. 1.1 can be readily solved by iterations. After applying an initial value for each data point, the new $\Phi_{i,j}$ can be readily calculated based on the values of its four neighbors, the charge density $\rho_{i,j}$, and the permittivity of a dielectric $\in$. This procedure can be iterated several times until the maximum difference between two successive iterations are less than the allowable tolerance. Hence, such smart memory computing can process multiple calculations simultaneously to yield high speed operation. In contrast, a conventional scalar computer only processes one calculation at a time and, therefore, is considerably slower.

Due to advances in the integrated circuit technology, semiconductor devices can be fabricated very inexpensively and abundantly in a monolithic silicon. Conceptually, the invention can designate one processor for each data point in a mesh so that executions can be carried out in parallel. In one implementation, each data point, stored in the Smart Memory Integrated Circuits (SMICs), is cycled through an execution unit and stored back into Data Memory Blocks (DMBs) after being processed. The data points in the mesh are all processed in parallel and are only limited by the available execution units. In this way, the number of the execution units in hardware can be reduced and yet the benefit of massive parallelism can be achieved.

Figure 5:
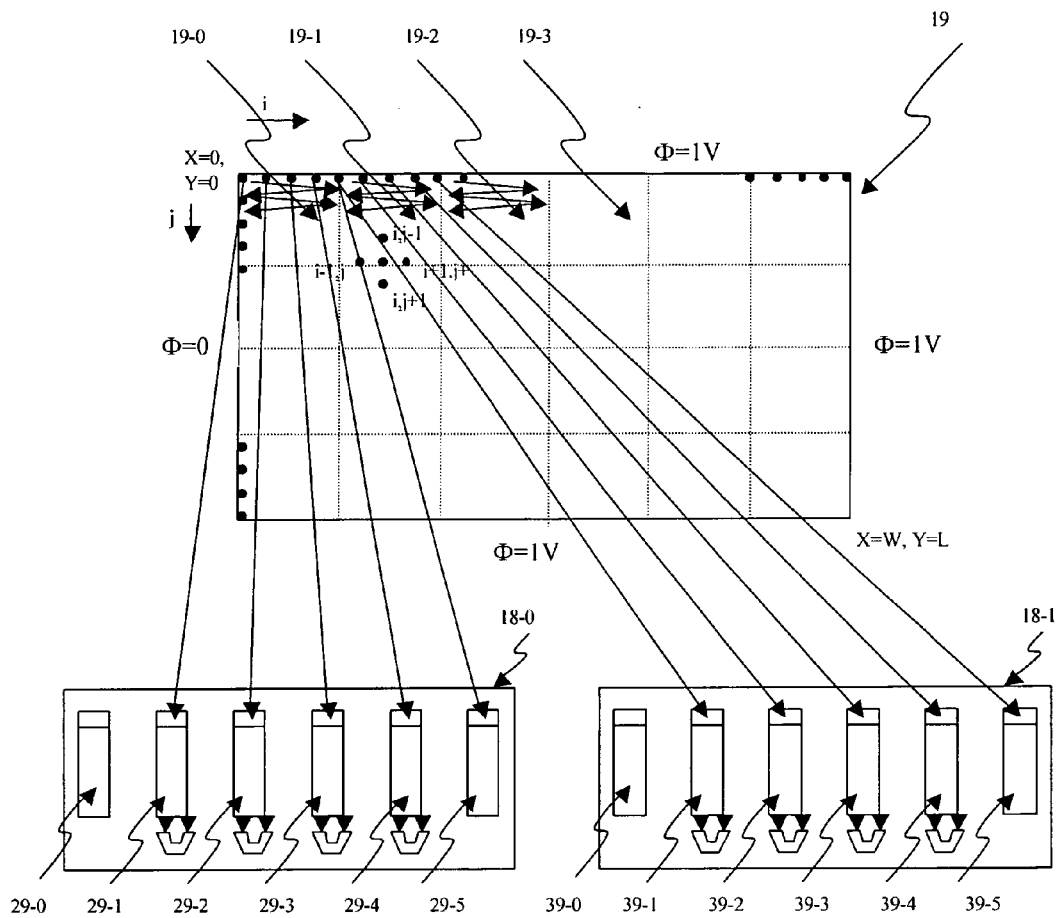
FIG. 5 shows the algorithm mapping for the SMIC to solve the 2D Poisson's equation.

FIG. 5 shows algorithm mapping between user space and SMICs according to one embodiment of the invention. Block 19 is the user space of interest. The sections 19-0, 19-1 in the user space are mapped into SMICs 18-0, 18-1, respectively. The blocks 18-0 and 18-1 in FIG. 5 are simplified versions of block diagrams to show the mapping between the user space and SMICs only. SMIC 18-0 has four Data Memory Blocks DMB1 through DMB4 (29-1 through 29-4), and one Left Data Memory Block DMB0 (29-0), one Right Data Memory Blocks DMBR (29-5), to store data overlapped between two adjacent SMICs 18-0 and 18-1. Similarly, the SMIC 18-1 has DMBs 39-0 through 39-5. The top five (5) data points in 19-0 are stored in the first entry of the Data Memory Block 29-1 through 29-5, respectively. The next row of the data points in 19-0 are stored in the second entry of the first row, or the next row if full, and so on. When the same smart memory instructions are applied to 18-0 and 18-1, the four (4) data points in each SMIC 18-0 and 18-1 are processed in their own execution units in parallel, and are stored back into the same or different Data Memory Blocks later. Note that each entry in the Data Memory Block can store more than one row of data points in the user space. The number of SMICs and the number of DMBs in a SMIC shown in FIG. 5 are for illustration purpose. For those skilled in the art understand that those numbers of DMBs and SMICs may vary but the concept remains within the scope of this invention. Another embodiment for mapping is to use the Left Data Memory Block, rather than the Right Data Memory Block as shown in FIG. 5.

After the initial values are applied to all the data points, the two sections of data 19-0 and 19-1 are mapped into SMICs 18-0 and 18-1 for processing. Then, the next two sections of data 19-2 and 19-3 are brought into the SMICs 18-0 and 18-1 to process. This procedure can repeat until all sections in 19 are exhausted. The next iteration then begins until the maximum differences between two successive iterations are within a tolerance.

If the data transfer between SMICs and the user space is very slow, another algorithm is doing more iterations until the tolerance is met before bringing in the next two sections of data from the user space. In one embodiment, there are data updates between SMICs in each iteration. For example, the updated data in 29-5 would be copied to Data Memory Block 39-1 before the next iteration can begin.

Figure 6:
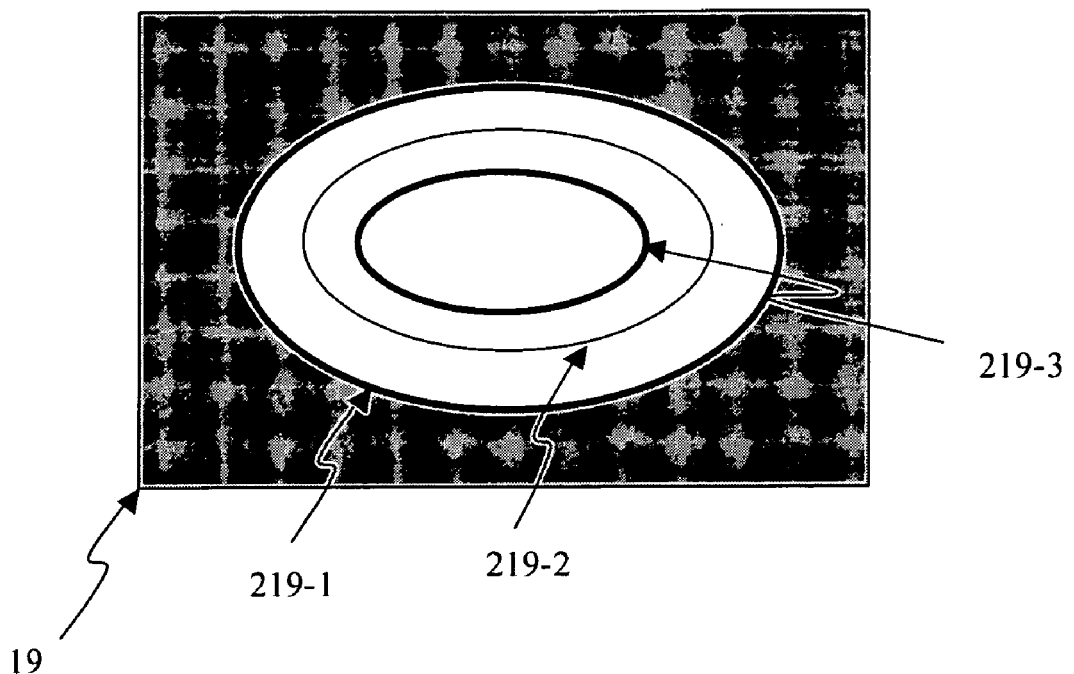
FIG. 6 shows an elliptic waveguide as a practice example for using smart memory computing.

Smart memory computing according to the invention can be further illustrated by a practical example. FIG. 6 shows an elliptic waveguide as a nontrivial problem that involves non-rectangular shape, fixed value boundary condition, Von Neumann boundary condition, and dielectric with two different permittivities. The user space 19 of interest includes boundaries 219-1 and 219-3 that define two conductors that form a waveguide. Two different types of dielectrics are filled between two conductors. The permittivity of the dielectric in the region between 219-1 and 219-2 is 1, and the permittivity of the dielectric between 219-2 and 219-3 is 3.9. To calculate the characteristics impedance, the conductors 219-1 and 219-3 are applied with voltages 1 and 0 volts, respectively. The potential $\Phi$ inside the dielectrics is governed by Poisson's equation $\nabla^2\Phi=\rho/\in$. The boundaries 219-1 and 219-3 have fixed-value boundary conditions of 1 and 0 volts, respectively. The boundary 219-2, separating two materials with different permittivities, has a different type of boundary condition. In the electromagnetic field theory, the Displacement vector needs to be continuous across the boundary of two dielectrics in the perpendicular direction, i.e., $\in\nabla\Phi\bullet N$ need to be continuous across two dielectric materials, where N is the vector perpendicular to the boundary.

A solution to the example can be determined in multiple passes. The first pass is to solve the Poisson's equation for the dielectric in the regions and the second pass is to calculate the continuity equation on the boundary 219-2. The area outside of the boundary 219-1 can be filled with fillers so that the parallel execution can be carried on in one pass. The filler can be, for example, a NaN, Not a Number, as in the IEEE 754 standard. Any operations involving NaNs still produce NaNs. Alternatively, an attribute bit can be set to indicate that this data point is a filler. In the convergence check when comparing two NaNs, the result can be set to zero by use of a SUBL instruction, SUBtract Literally, so that the magnitude comparison can be carried out in parallel even for fillers. The fixed-value boundary condition can be treated the same way by use of an attribute bit for "fixed value" before any smart memory execution begins. Any operation to generate a new result for those data points marked "fixed value" will be nullified. To consider two permittivities in the same parallel instruction, each execution unit has coefficient bits to select global coefficient registers (COEFREG) as the source operands. For example, the COEFFREG[1]=1 and COEFFREG[2]=3.9 are preloaded with two permittivities. The coefficient attributes for data points in the execution units 3 and 4 are set to 1 and 2, respectively. When one source operand of a parallel instruction is the coefficient register, the global coefficient registers 1 and 2 will be selected for execution units 3 and 4, respectively. By using the coefficient bits in the instruction field associated with each execution unit, the coefficients can be customized for each data point such that two passes can be merged into one.

Figure 7:
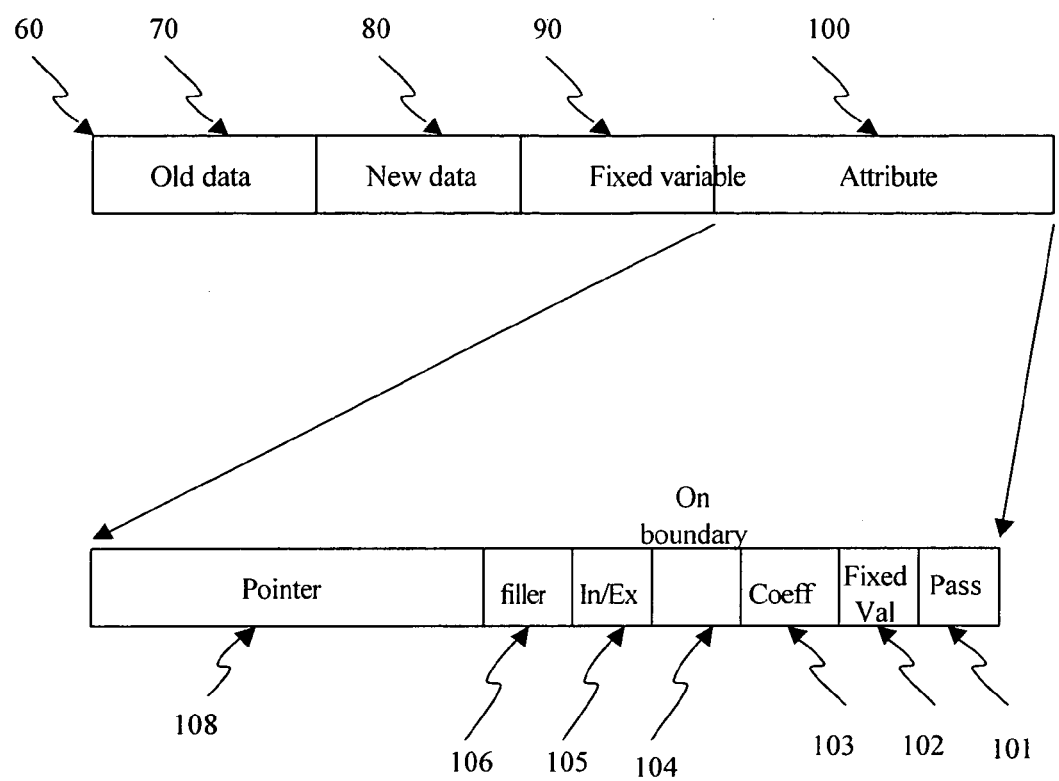
FIG. 7 shows the data structure of the attribute field.

Attribute bits can be included in a data structure for data to indicate the properties of each data point. FIG. 7 shows a representative data structure of each data point in the mesh according to one embodiment of the invention. Note that the data structure is a software concept that is built into the code during compilation. The hardware just executes the code in parallel. As show in FIG. 7, the fields in the data structure 60 include, but are not limited to: old data 70, new data 80, fixed variables 90, and attribute bits 100. The old data and the new data store one data set in the previous and the current iterations. In Poisson's equation, a data set includes only one variable $\Phi_{i,j}$. In Computational Fluid Dynamics (CFD), a data set normally consists of 5 variables, density, pressure, and three velocity vectors. The fixed constants for each data point in the Poisson's equation is $\rho_{i,j}$.

I. The attribute field consists of the pass 101, fixed value 102, coefficient 103, on boundary 104, interior/exterior 105, fillers 106, and a pointer 108 for additional vectors, if any. The pass bit 101 in the attribute field 100 specifies which passes this data point will be processed in a multiple-pass execution. The old data 70 and the attribute field 100 of each data point are normally loaded into a Data Point Register (DPR) and Data Attribute Register (DAR), respectively, of each execution unit before any executions for that data point can begin. The pass bit 101 in the DAR of each execution unit is compared with a global Pass Register (PASSREG) and updates the execution results if it matches; otherwise, the old data in DPR will be used instead. The coefficient bits 103 in the attribute field are used to index global coefficient registers (COEFFREG) allowing simple customization in the same pass, when a parallel instruction uses coefficient register in the source operands. The fixed value bit 102 in the attribute nullifies updating this variable after any smart memory executions. When the data point falls on the boundary that has fixed values, this bit is set in the attribute. The "on boundary" bit 104 and the interior/exterior bit 105 specify the geometry locations of a region. The filler bit 106 can be applied to those data points outside the region of interest that should be marked as "fillers" to make up a rectangle. When "on boundary" bit 104 is set but fixed value bit 102 is not, this is a Von Newmann boundary condition.

II. The pointer field 108 in the attribute specifies the location to store additional information for some data points. For example, if the data point happens to be on the boundary that has a Von Neuman type of boundary condition, the perpendicular direction to the boundary is needed and can be specified by the pointer. The pointer can specify where to find the three components of the perpendicular vendors in a 3D problem.

Figure 8:
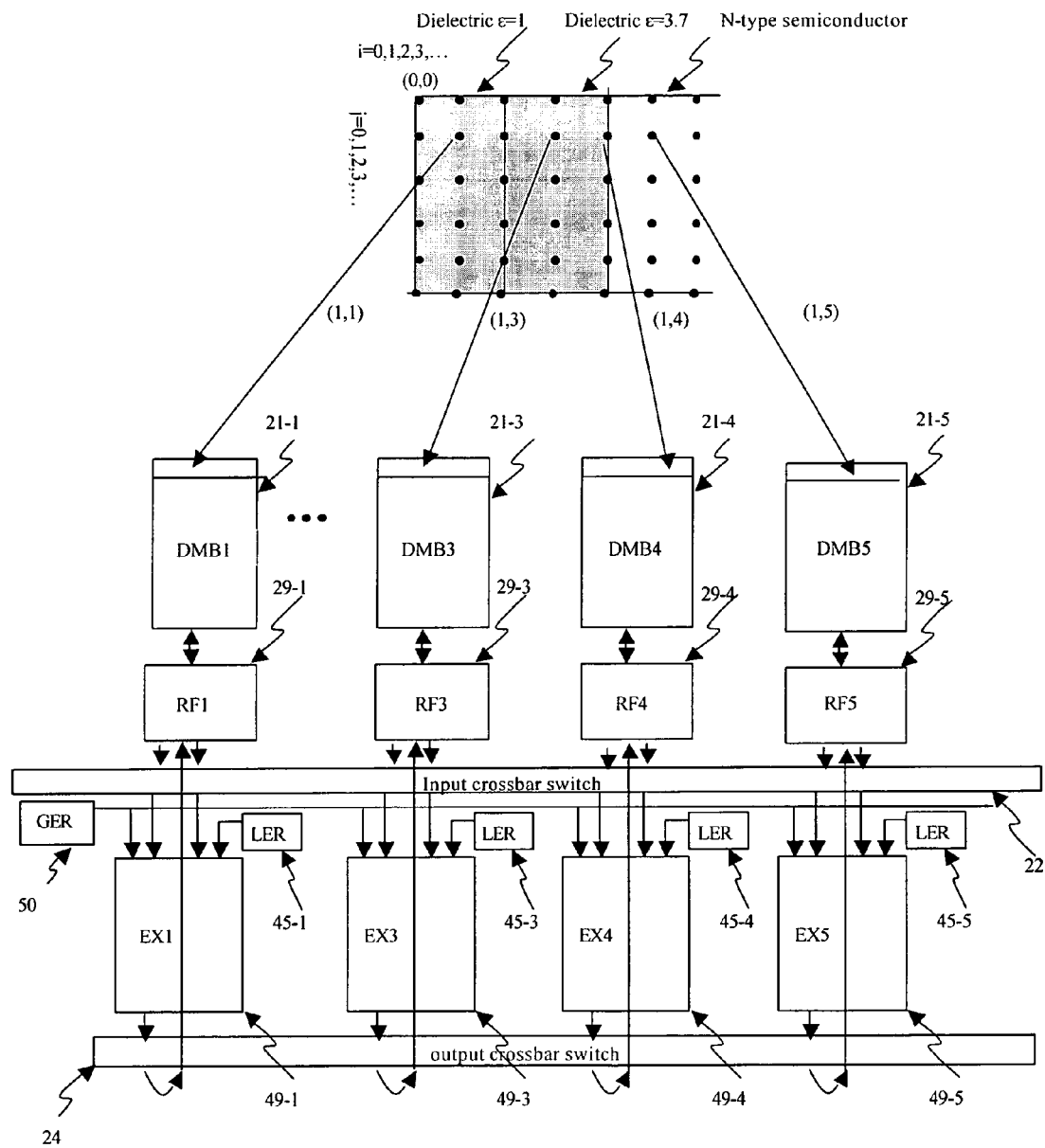
FIG. 8 shows one embodiment of datapath about the Execution Units (EX), Global Execution Registers (GER), and Local Execution Registers (LER).
Figure 8A:
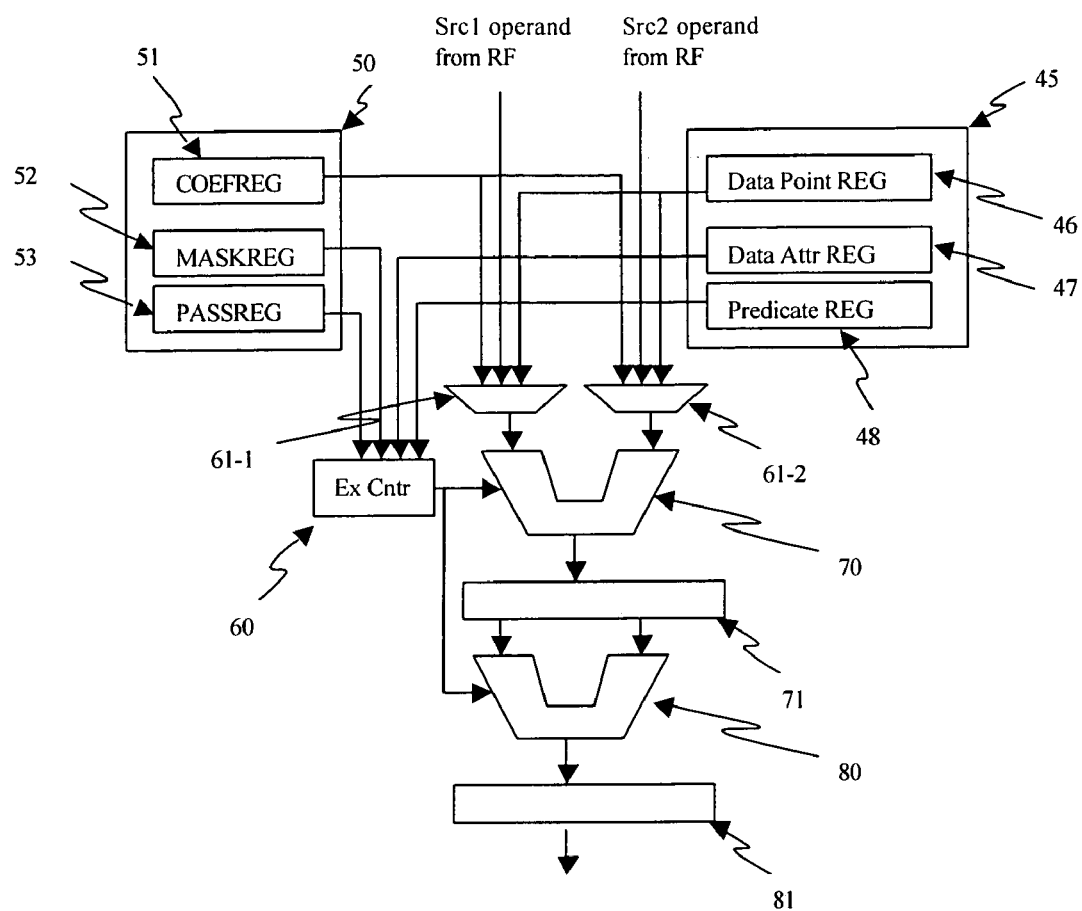
FIG. 8(a) shows the detailed diagram of the EX, GER, and LER.

FIG. 8 shows one embodiment of the datapath to process data points (1,1), (1,3), (1,4), and (1,5) in an SMIC. The data points (1,1), (1,3), (1,4), and (1,5) for the three regions, air, silicon dioxide, and N-type semiconductor are mapped into the first entry of the Data Memory Block (DMB1,3,4,5) 21-1, 21-3, 21-4, and 21-5, respectively. Blocks 29-1, 29-3, 29-4, and 29-5 are Register Files, RF1, RF3, RF4, and RF5 respectively, coupled to the corresponding DMBs to store temporary data before and after processing. Block 49-1, 49-3, 49-4, and 49-5 are Execution Units, EX1, EX3, EX4, and EX5 respectively, to process data in parallel. Block 50 is the Global Execution Registers (GER) to store control and data for all execution units. Blocks 45-1, 45-3, 454, and 45-5, are Local Execution Registers (LER) to store control and data for EX1, EX3, EX4, and EX5, respectively.

FIG. 8(*a*) shows more detailed block diagram further to illustrate the execution units and the global and local execution registers GER and LER. The Global Execution Register (GER) 50 consists of global control register such as Mask Register 52, Pass Register 53, and global data registers such as Coefficient Register (COEFREG) 51. Those registers are applied to all execution units. On the contrary, the Local Execution Registers (LER) 45 are local data and control registers applied to each execution unit only. The Data Point Register (DPR) 46 can be loaded with the old data. The Data Attribute Register 47 can be used to store the attribute bits as shown in FIG. 7. The Predicate Register (PR) 48 stores the control bits and flags to validate or invalidate an operation. The Predicate bits can be explicitly set in the instruction, or set as results of operations. The flags after ALU operations can be "C", "Z", "P", "N", "PZ", or "NZ", to indicate carry, zero, positive, negative, non-negative, or non-positive. Similarly, the floating-point flags can be "O", "U", "D", "DZ", "I", "NaN", "FZ", "FP", or "FN", to indicate overflow, underflow, denorm, divided-by-zero, infinity, Not-a-Number, floating-point zero, floating-point positive, or floating-point negative. The blocks 61-1 and 61-2 are the input multiplexers to select the source operands for the execution unit to operate on. The block 63 is the execution control to validate or invalidate an execution getting signals from the global or local execution control registers. Block 73 and 83 are two execution stages in the pipeline. The block 71 and 81 are the pipeline registers at the output of each execution stage 73 and 83, respectively. Those skilled in the art understand that the numbers of the global, local execution registers and execution pipe stages are for illustration purpose. The number may vary and the concept is still within the scope of this invention.

Figure 9:
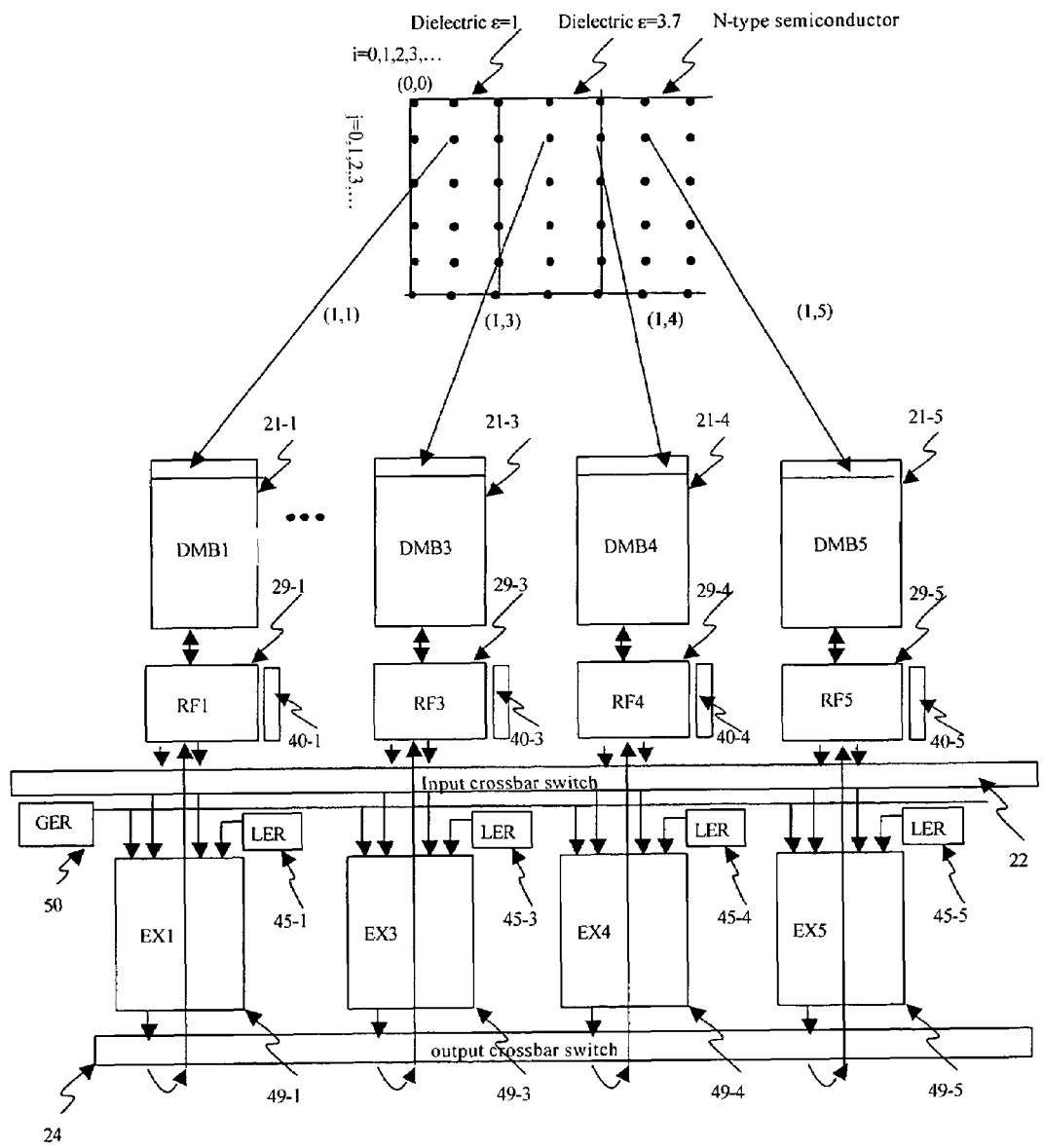
FIG. 9 shows another embodiment of datapath about the Execution Units (EX), Global Execution Registers (GER), and Local Execution Registers (LER) with tag bits in the register files.
Figure 9A:
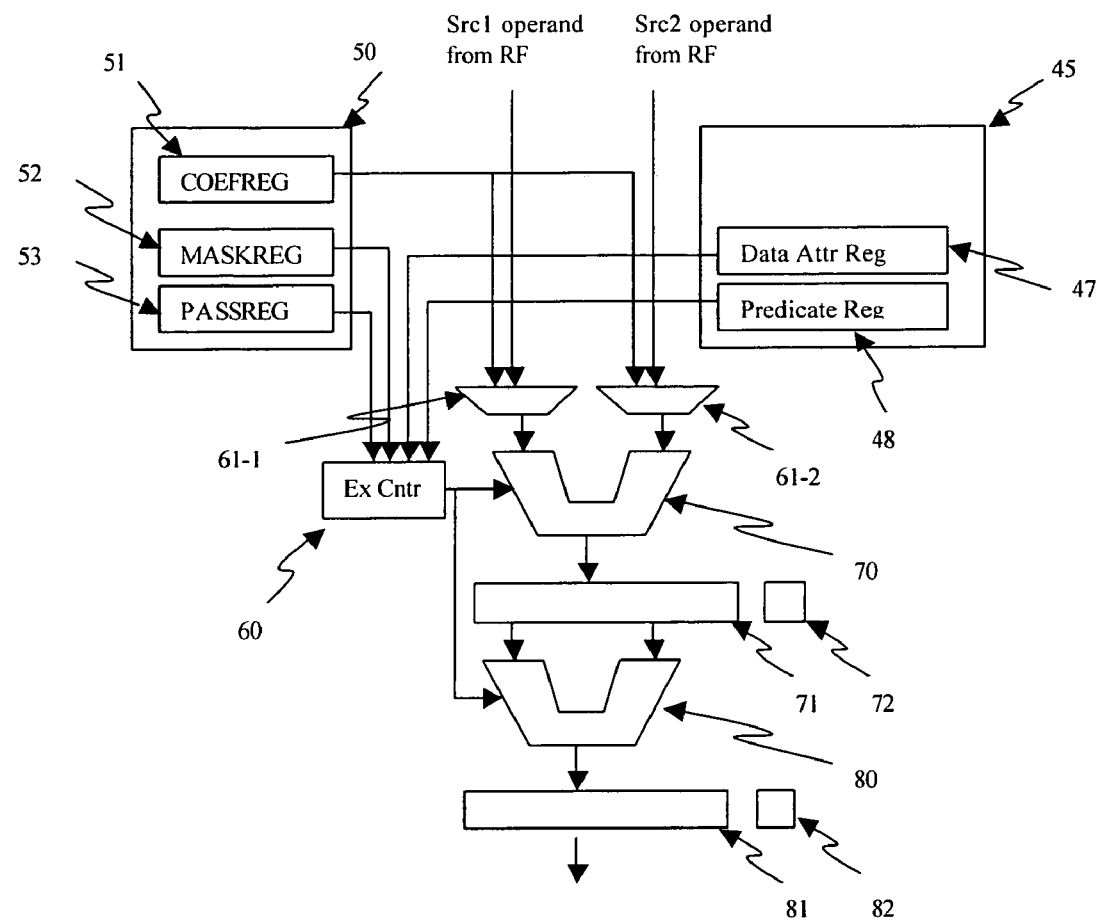
FIG. 9(a) shows the detailed diagram of the EX, GER, and LER with tag bits in the pipeline registers.

FIGS. 9 and 9(*a*) show another embodiment of the datapath. The Data Point Register is not implemented in this embodiment. Instead, the register files 29-1, 29-3, 29-4, and 29-5 in FIG. 9 are tagged with "update bits" 40-1, 40-3, 40-4, and 40-5 respectively to indicate valid new data. Similarly two pipeline registers 71 and 81 in FIG. 9(*a*) are tagged with "update bits" 72 and 82 respectively to indicate valid new data to be stored into the tag bits in the register files.

FIG. 9(*b*) shows a representative example of the pseudo-code of instruction executions in smart memory to calculate each new data according to (Eq. 1.1). For example, M[A0,1] specifies the content of the memory address for data point (0,1) in the mesh. Similarly M[ρ1,3] specifies the content of the memory address for the charge density ρ at data point (1,3). In the actual code, only the opcode and the operands of the leftmost execution unit (EX1) are shown. The memory addresses for the other DMBs for parallel execution units can be generated automatically by using a stride register as an offset. For example, if each data point is 4-byte wide, A0,1=A0,0+4 if the data is stored as a row major configuration.

The first instruction "load M[A1, 1*a*],DAR.1" loads the attribute fields of data points (1,1), (1,3), (1,4), and (1,5) into each DAR, where A1,1*a* is the address of the attribute field for data point (1.1), to set the coefficient and the pass bits accordingly. Instruction 2 loads the old data into each Data Point Register (DPR) of the four execution units respectively. Instruction 3 sets the global pass register PASSREG to zero (0) to start processing data point (1,4) while the other three data points are kept the same. The Von Neumann boundary condition for point (1,4) is processed in instructions 3 through 19 involving indirect memory addressing to fetch the vector perpendicular to the boundary.

Instructions 20 through 32 process data points (1,1) and (1,3) by setting PASSREG=1 in instruction 20. The first four load instructions 21-24 load the four neighbors into register files, and followed by three add and a divide instruction to take the average of the four neighbors. Instructions 29 through 30 calculate ρ/∈, the charge density divided by permittivity. Instruction 30 specifies the coefficient registers being used as the source operands in a division. Since data points (1,1) and (1,3) have different permittivities of 1 and 3.9, respectively, these two values are selected by coeff=1 and 2, COEFFREG[1]=1 and COEFFREG[2]=3.9, according to the coefficient field in the DARs. Instruction 31 calculates the final values of each data point. The qualifier "f" indicates the resultant operand is the final result and will be stored back into the DMB through register files. Therefore, the data updated into R1.8, R3.8, R4.8, or R5.8 should depend on the pass bits and the fixed-value bit of each data point. In this example, the registers R4.8 and R5.8 will be unchanged, but the registers R1.8, and R3.8 will be updated into the data memory M[A1,1] and M[A1,3], respectively. Instruction 33 sets pass=2 into PASSREG to process point (1,5) only in the subsequent instructions.

Figure 10:
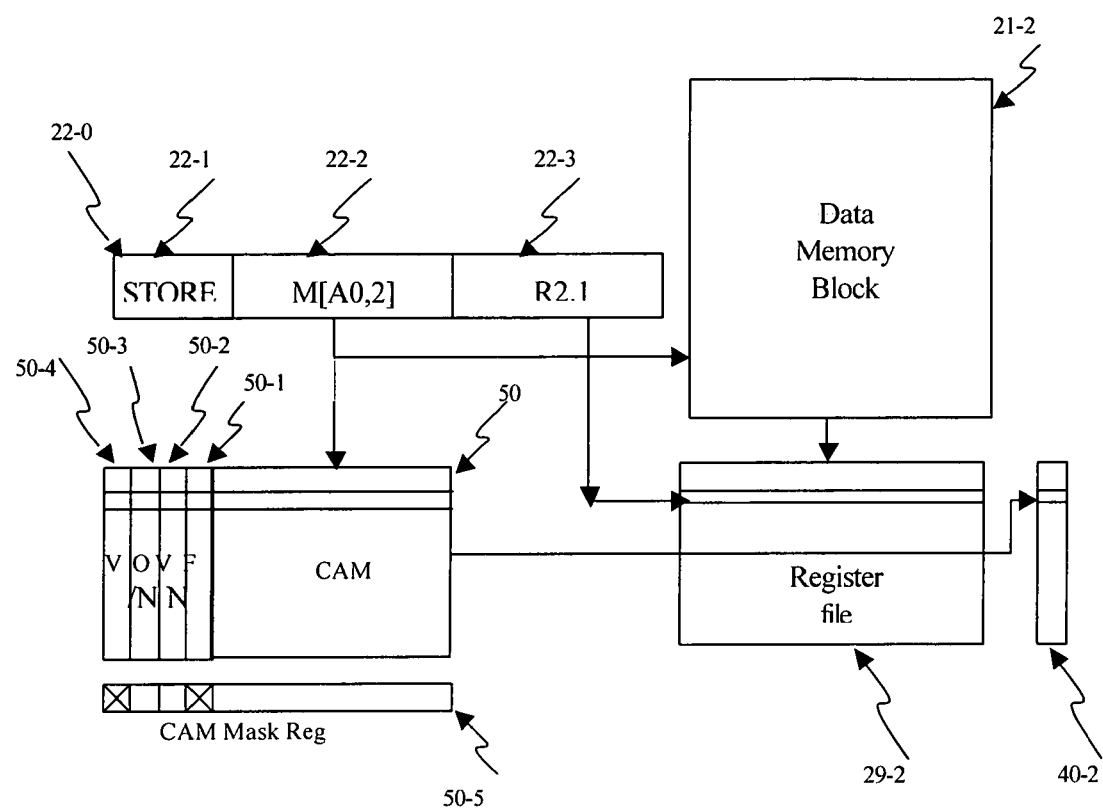
FIG. 10 shows another embodiment to use Content Addressable Memory (CAM) to process fixed-value boundary conditions.

Another embodiment is to use hardware to process the fixed-value and Von Newman boundary conditions rather than using a data structure. FIG. 10 shows how a Content Addressable Memory (CAM) solves the fixed-value boundary condition problem. 22-0 is the bit field of a STORE instruction fetched from instruction memory and decoded in the instruction decoder. The three bit fields, 22-1, 22-2, and 22-3, are the opcode, memory address, and register file entry, respectively. Those data points that are supposed to have fixed values have their memory address stored in a CAM 50. The tag arrays 50-1, 50-2, 50-3, and 50-4 store the fixed (F), Von Neuman (VN), Old/New (O/N), and Valid (V) tag bits for each CAM entry. The CAM Mask Register 50-5 can be set to selectively turn on which tag field and which address bit field in each entry to check. To process the fixed-value boundary condition, the F bit, V bit field, and all address bits should be set in the CAM Mask Register 50-5. The memory address field 22-2 along with the CAM tag bits are checked against all entries in the CAM 50 for any matches when executing a STORE instruction. If there is a match, storing data from the register file to DMB will be nullified.

Figure 11:
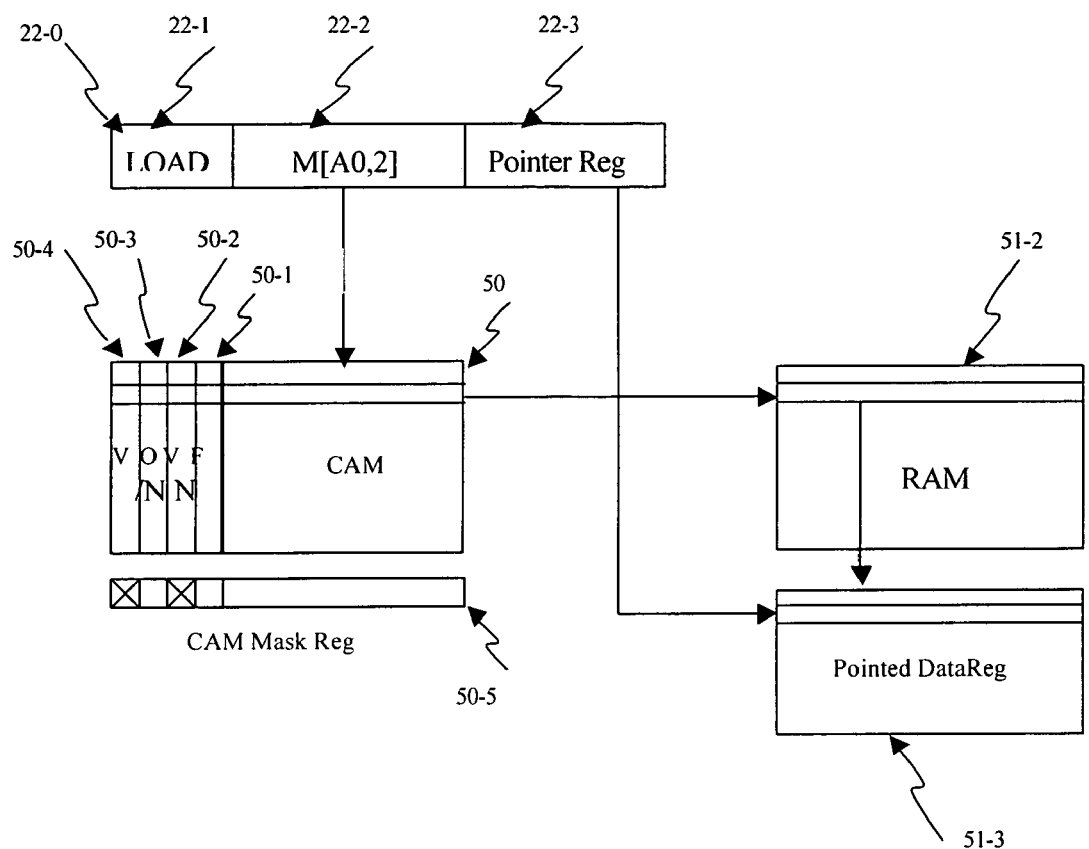
FIG. 11 shows another embodiment to use CAM to process the Von Newmann boundary conditions.

FIG. 11 shows a hardware solution to process Neumann's boundary conditions without using data structure concept. To process Neumann's boundary condition, the vectors normal to (perpendicular to ) the surface are needed, and they vary from location to location on the boundary surface in 3D space, for example. The normal vectors are stored in RAM 51-2, and are associated with coordinates of the locations stored in Content Addressable Memory (CAM) 50. The association may not be one to one. The instruction 22-0, when executed, finds the normal vectors in the RAM 51-2 through a parallel search in CAM 50 and put the results into Pointed Data Registers 51-3.

The instruction 22-0 to find the normal vectors on boundary surfaces of memory addresses and put the results into registers have three bit fields, instruction opcode 22-1, memory address 22-2, and pointer register 22-3. The opcode field 22-1 specifies a special "LOAD" instruction opcode to load the normal vector on a boundary. The memory address field 22-2 specifies the memory address of coordinates of Neumann's boundary. And the pointer register field 22-3 specifies the register index of where the resultant vectors reside after parallel search conducted on the CAM 50. The CAM 50 stores the memory addresses to be matched and a plurality of tag bits such as Valid bit (V) 50-4, Von Neumann bit 50-2 (VN), Old/New bit (O/N) 50-3, and Fixed-value bit (F) 50-1. The Valid bit 50-4 specifies if that particular entry contains valid data or not. The Von Neumann bit 50-2 specified if that particular entry falls on Neumann's boundary condition. The Old/New bit (O/N) 50-3 toggles to mark as "Old" once that particular entry has been matched. The Fixed-value bit 50-1 specifies if that entry is fixed-value type of boundary condition. With the F and NV bit, the addresses of Fixed-value and Neumann's boundary conditions can be put into the same CAM 50. The CAM Mask Register 50-5 has the same bit fields as one entry of CAM 50 to enable the corresponding bit field in the parallel search when set.

The Old/New bit is designated for resolving multiple matches. In such a case, the O/N bit of the matched entity will be marked as "Old" so that this entry will be skipped in other matchings later. This process can continue until all entries in the CAM 50 are sought out for matches. Then an Old/New bit in a global register will be toggled to change the meaning of "Old" into "New". The connotation of "Old/New" in each entry of CAM 50 is relative to the Old/New bit in the global register.

When all VN continuity equations are processed in a pass, the Old/New bit in a global control register will be toggled so that all VN entries will become new in the next round of processing VN boundary condition. Either the fixed-value or Von Neumann's boundary conditions in FIG. 10 and FIG. 11 is processed one at a time. If the CAM 50 has multiple ports, many addresses can be processed at the same time, but the cost is higher.

Figure 12:
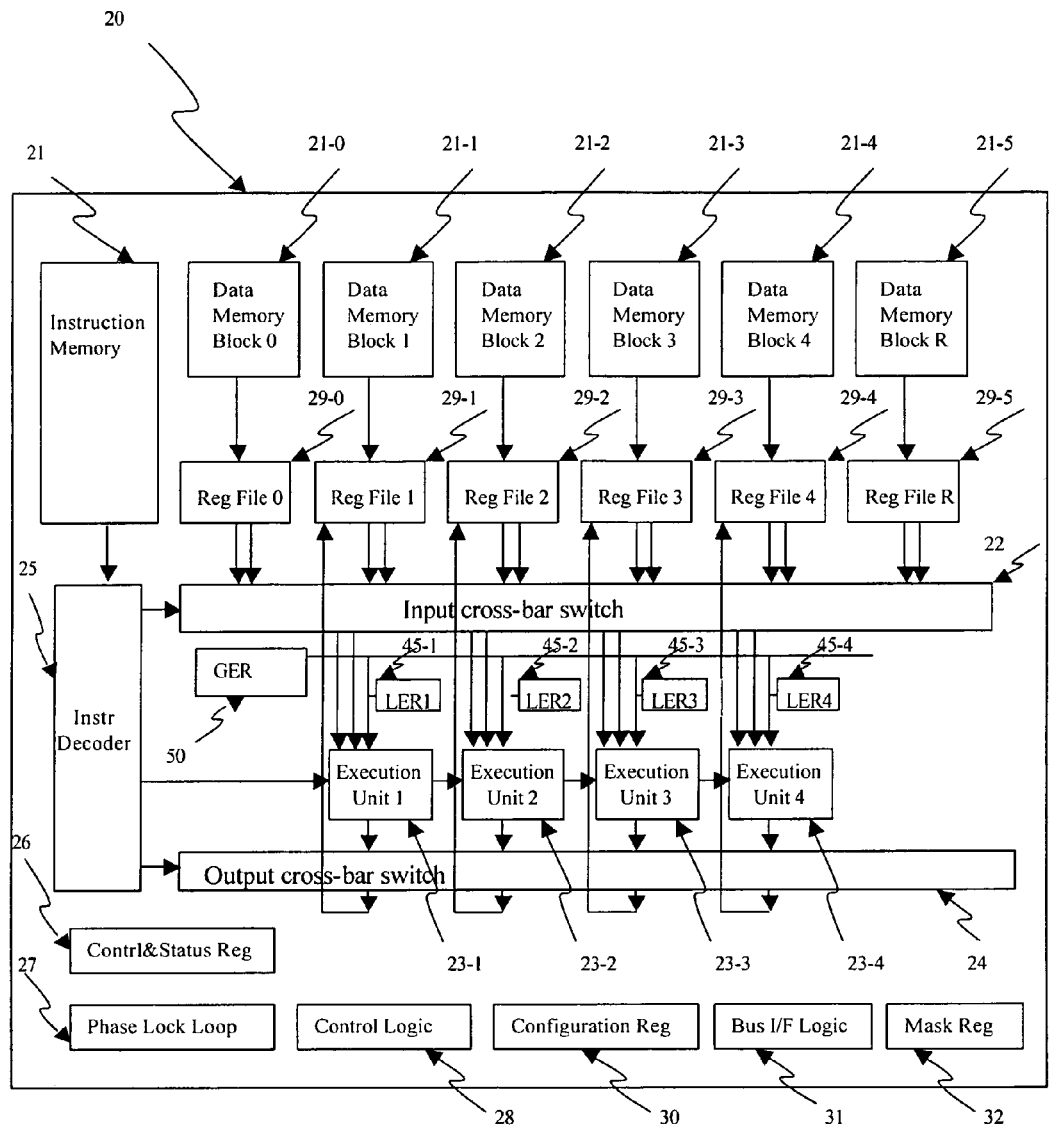
FIG. 12 shows a complete block diagram of an SMIC.
Figure 12A:
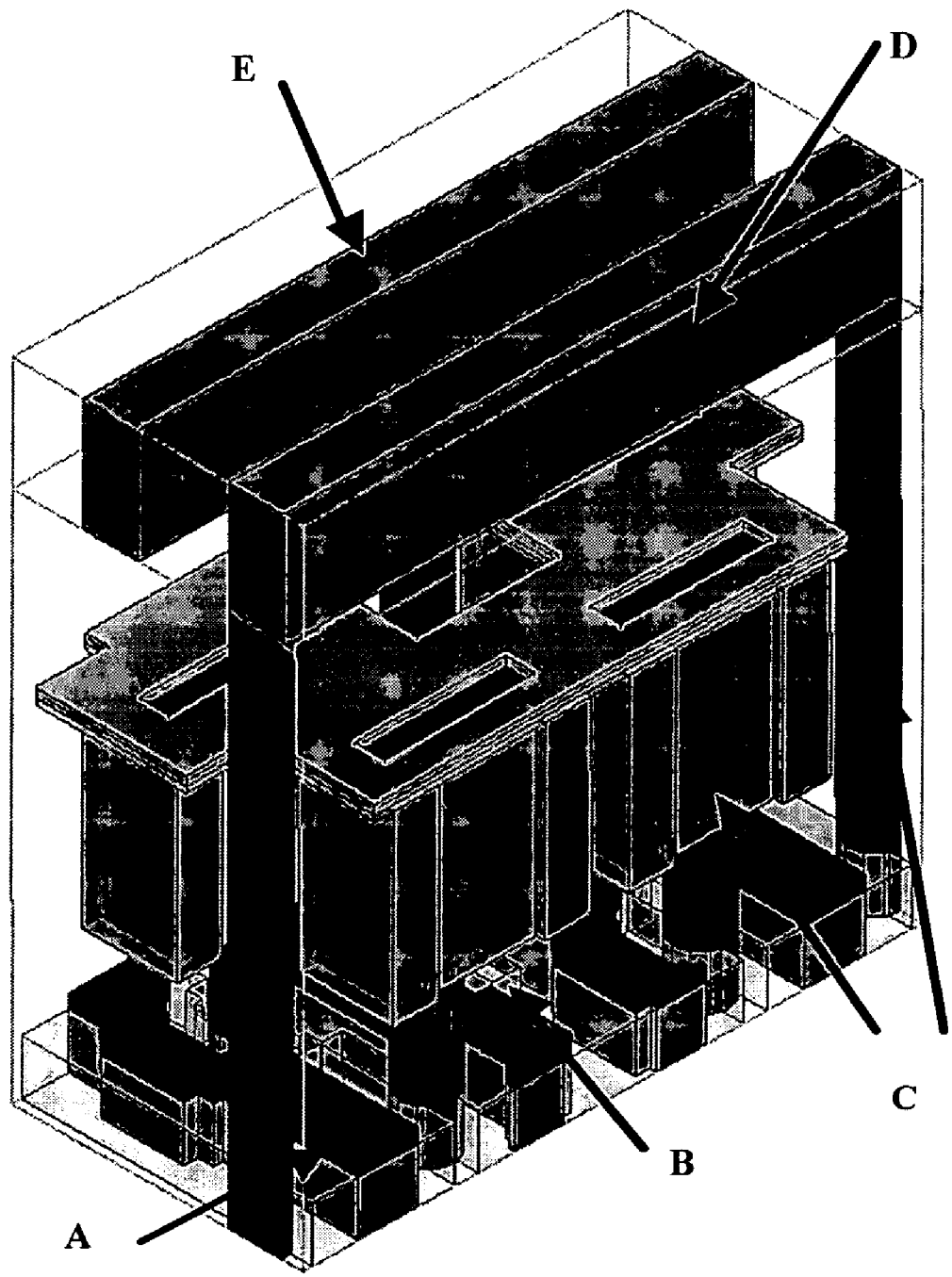
FIG. 12(a) shows a graphical user representation for Smart Memory Computing.
Figure 12B:
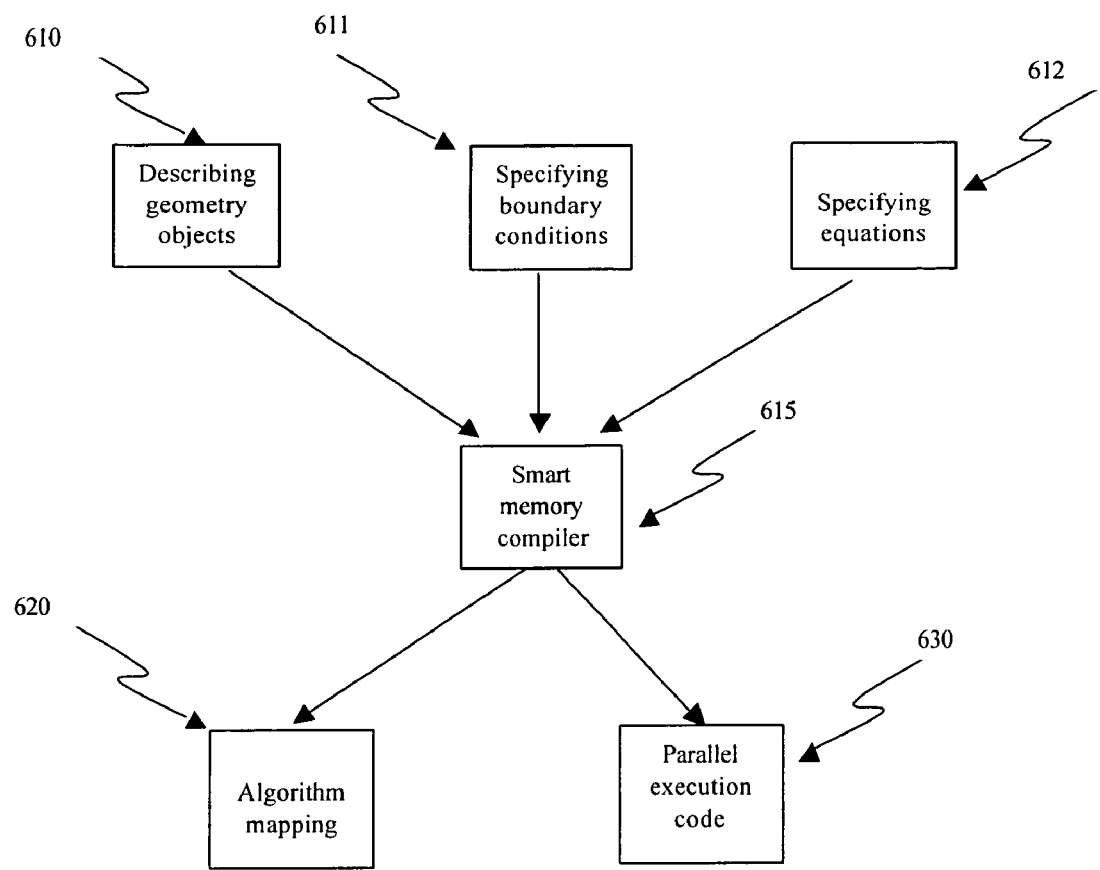
FIG. 12(b) shows a block diagram of how a smart memory compiler works, according to one embodiment.
Figure 13A:
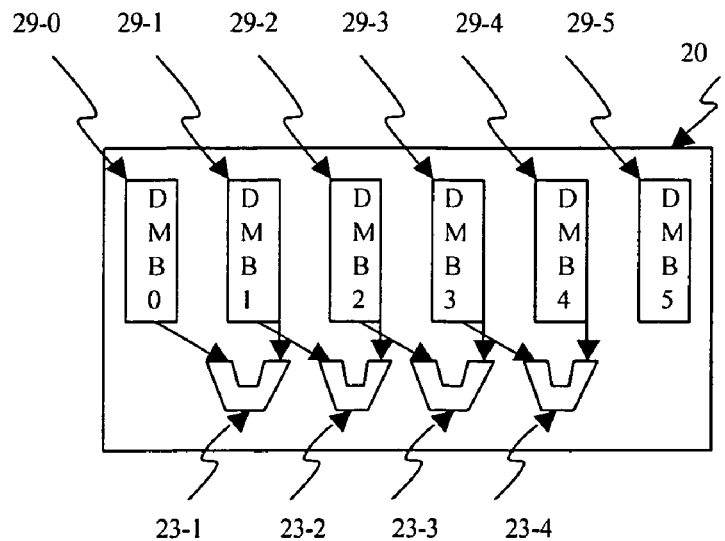
FIG. 13(a),(b) shows a parallel ADD instruction without any qualifier.
Figure 13B:
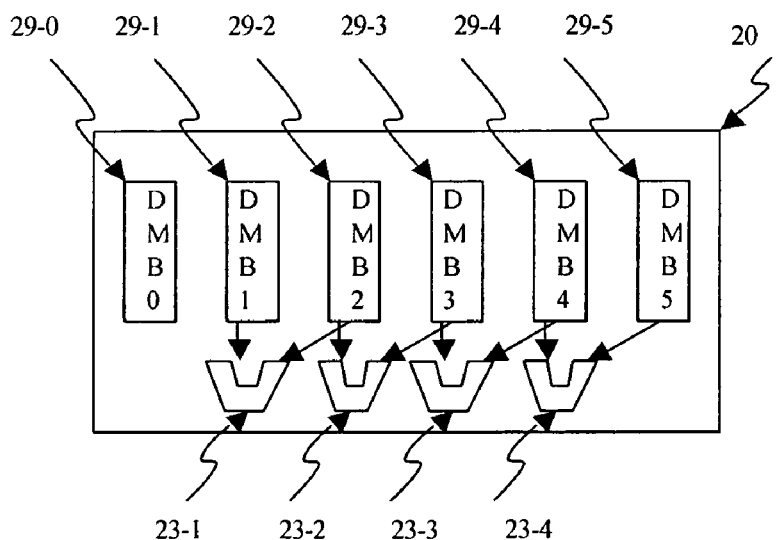
FIG. 13(c) shows a parallel ADD instruction with qualifier "W" for register file access in wrap-around fashion.
FIG. 13(d) shows a parallel ADD instruction with qualifier "L" using a source operand from the leftmost register file for all execution units.
FIG. 13(e) shows a parallel ADD instruction with qualifier "R" using a source operand from the rightmost register file for all execution units.
FIG. 13(f) shows a parallel AND instruction with qualifier "C" to concatenate the source operands from all register files into one.
Figure 13C:
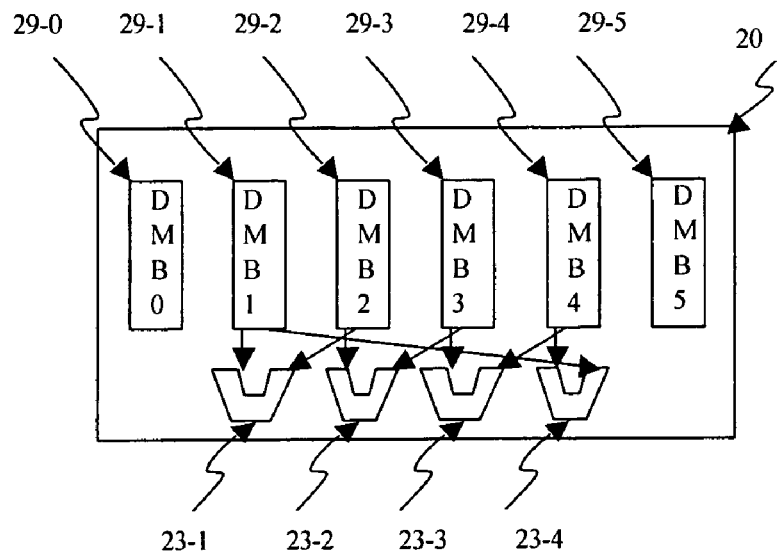
Figure 13D:
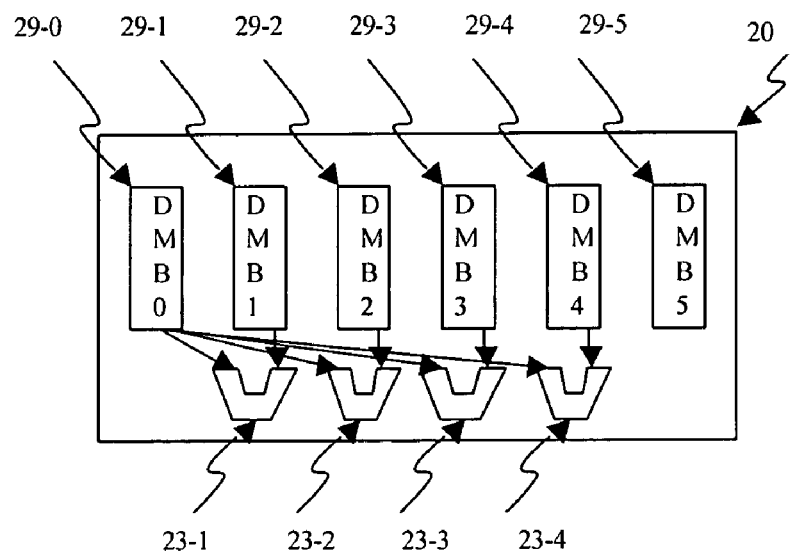
Figure 13E:
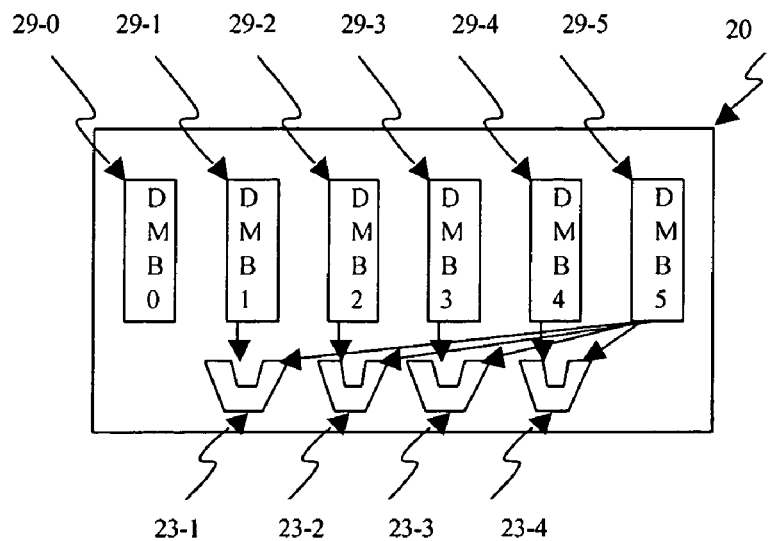
Figure 13F:
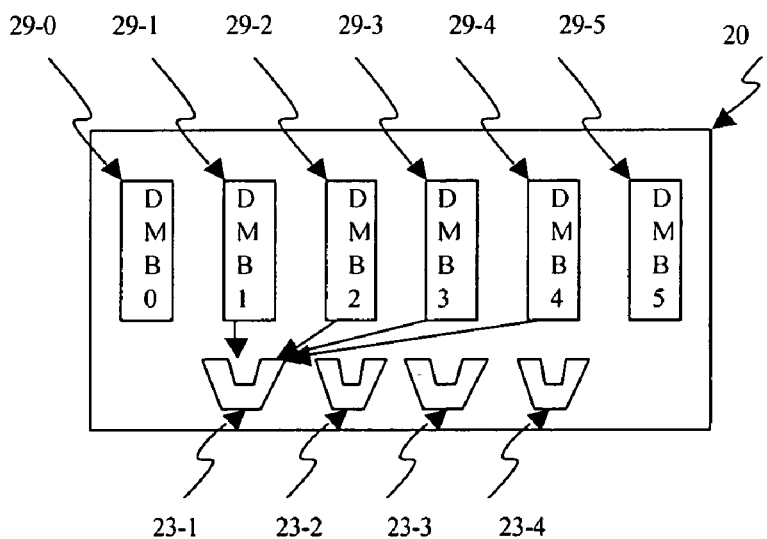

FIG. 12 shows a complete block diagram of an SMIC 20. The 21-0 through 21-5 are Data Memory Blocks (DMBs). Particularly, the DMB0 and DMB5 are called DMBL(eft) and DMBR(ight), respectively. The DMB0 through DMB5 are connected with register files (RFs) 29-0 through 29-5. The RFs 29-1 through 29-4 couple with an input crossbar switch 22 to connect with execution units 23-1 through 23-4. Note that no execution units are associated with either DMBL or DMBR. The output of the execution units 23-1 through 234 are stored back into their respective register files 29-1 through 29-4 via an output crossbar switch 24. Each execution unit has a plurality of Local Execution Registers (LER) 45-1 through 45-4 to store the attribute field, old data, and predicates, etc. The Global Execution Registers (GER) 50 have control registers, such as Pass Register, Mask Register, to control execution globally, and data registers, such as Coefficient Registers, to supply data for all execution units.

2. Graphical User Representation and Compiler Techniques

A compiler for smart memory computing is more than just generating assembly codes from high level languages line by line and page by page as in conventional computing. The compiler is also responsible for mapping the datapoints in the user space for the problems to be solved to the smart memory space by preserving meaningful physical locations so that parallel executions can be carried on with ease. This mapping involves how to describe geometry objects to the smart memory computing. Conventional computing does not require the physical locations of the datapoints for processing. However, the physical locations of the datapoints are vital for algorithm mapping in the smart memory computing. One embodiment of an interface between user space and the smart memory space is through a graphical user representation, e.g., provided by a graphical user interface so that datapoints in the user space can be mapped directly to the smart memory space FIG. 12(*a*) shows graphical user representation for Smart Memory Computing. The example represented in FIG. 12(*a*) is a complicated problem comprising several geometry objects, and this is more complicated than the simple elliptical waveguide described in FIG. 6. The objects A, B, C, D, and E can be constructed by graphics methods such as solid modeling, or wire modeling and by any graphics tools such as AutoCad drawings program, which is well known in the art. For example, the objects in FIG. 12(*a*) was built by drawing a top view with Z-dimension information specified separately for each object. Another embodiment is to draw a top view, and two side views to construct rectangular objects. For any arbitrary objects, Beize or Spine functions are usually used to define shapes. This type of approach is commonly used to build mechanic parts in automobile or aircraft industry. The 3D objects shown in FIG. 12(*a*) are not only to specify a problem to be solved but also to display results, such as contours of electrical field, after the problem is solved by smart memory computing.

Boundaries of any geometry objects can be specified similarly as any 3D objects described above by labeling surfaces with different colors to associate with values or boundary types. The 3D objects and boundaries can be output as text files for smart memory compiler to read.

Equations to govern how datapoints interact, after boundary conditions are applied, in a smart memory computing can be specified by mathematical formula such as mathematical symbols, alphabet, Greek letters, or any combinations of the above. For examples, the Poisson's equation for the elliptical waveguide shown in FIG. 6 can be specified simply as $\nabla^2\Phi=\rho/\in$ in any word processor. The symbols, alphabet, or Greek letters can be output as text files for smart memory compiler to read.

FIG. 12(*b*) shows a block diagram of describes how a smart memory compiler 615 works, according to one embodiment. Smart memory compiler takes the geometry objects 610, boundary conditions 611, and governing equations 612 to do algorithm mapping 620 and generate parallel execution codes 630. If an algorithm such as finite difference is used, the algorithm mapping simply places datapoints in the user space into smart memory space by fitting one small chunk of datapoints into smart memory integrated circuits one by one. However, if an algorithm such as finite element is used, the compiler is also responsible for preprocessing the input files by dividing objects into small pieces, assigning variables, and generating relationship among those variables. In general, preprocessing may be needed for a smart memory compiler before algorithm mapping and parallel execution code generation based on the parallel instruction set the smart memory computing provides.

3. New Instructions

The abundant tightly-coupled processors in a smart memory computing system allows many specialized instructions to make parallel processing more efficient. The Simple Instruction Multiple Data (SIMD) architecture can be a single instruction applied to many data that behave exactly the same way. However, the smart memory computing is more than the SIMD architecture and allows the register files being indexed, the memory being addressed with offset among the different functional units and allows the parallel instructions with different qualifiers.

For example, the LOAD instruction 21 in FIG. 9(*b*) shows:

Load M[A0,1],R1.1 Load M[A0,3],R3.1 Load M[A0,4],R4.1 Load M[A0,5],R5.1, this parallel instruction specifies the memory location at A0,1 being loaded into the entry 1 of RF1, the memory location at A0,3 being loaded into entry 1 of RF3, and so on. If each data structure takes 4 bytes, the memory addresses A0,1, (A0,1)+8, (A0,1)+12, and (A0,1)+16 are loaded into entry 1 of RF1, RF3, RF4, and RF5, respectively. Similarly the ALU instructions can take the operands from other register files for executions. For example,
ADD R1.1,R0.3,R1.2 ADD R3.1,R2.3,R3.2 ADD R4.1,R3.3, R4.2 ADD R5.1,R4.2,R5.2, the ADD instruction adds the entry 1 of RF1, RF3, RF4, and RF5 with entry 3 of RF0, RF2, RF3, and RF4 for entry 2 of RF1, RF3, RF4, and RF5, respectively. Since the memory addresses and the register file index can be generated automatically, only the leftmost instruction is specified. The qualifiers in the parallel instructions specify how to index the register files, and the stride registers specify how to generate the memory addresses.

FIGS. 13(*a*),(*b*),(*c*),(*d*),(*e*) show different types of parallel instructions ADD; ADD,W; ADD,R; ADD,L; and ADD,C. In FIG. 13(*a*)-(*e*), block 20 is the simplified block diagram of an SMIC. Blocks 29-0 through 29-5 are the Data Memory Blocks (DMB) 0 through 5. Blocks 23-1 through 23-4 are the execution units associated with DMB1 through DMB4.

FIG. 13(*a*) shows an "ADD" instruction without any qualifiers. "ADD R0.3, R1.5, R1.6" adds entry 3 of the immediate left RF with entry 5 of the each RF and stores the result back into the entry 6 of the each RF. The rightmost register file RFR is not used. FIG. 13(*b*) shows another ADD instruction without any qualifiers. "ADD R2.3, R1.5, R1.6" adds entry 3 of the immediate right RF with the entry 5 of the each RF, and stores the result back into the entry 6 of the each RF. The leftmost register file RF0 is not used. FIG. 13(*c*) shows an instruction with a qualifier "W" for wrapping around. "ADD,W R2.3, R1.5, R1.6" add the entry 5 of the each RF with the entry 3 of the immediate right RF, or wrapping around to RF1 if indexed beyond RF4, and stores the results back into the entry 6 of the each RF. Neither RF0 nor RFR is used. This wrap-around function is very useful for Digital Signal Processing (DSP) to processing signal or image in a circular fashion.

FIG. 13(*d*) and (*e*) shows two ADD instructions with qualifier "L" and "R" such that the RF0 and RFR are used for all execution units, respectively. FIG. 13(d) shows an instruction "ADD,L R0.3, R1.5, R1.6" to add entry 3 of RF0 with entry 5 of the each RF and store the results back into the each RF. Similarly, FIG. 13(e) shows an instruction "ADD,R RR.3, R1.5, R1.6" to add entry 3 of RFR with entry 5 of the each RF and stores the results back into the each RF. FIG. 13(f) shows an ADD instruction with qualifier "C" for Concatenation. The instruction "AND, C R1.5, R1.6" ANDs the entry 5 of all registers, except RF0 and RFR, and stores the result into entry 6 of RF1. Another useful concatenation instructions are "MAX, C R1.5, R1.6" and "MIN,C R1.5, R1.6". These two instructions find the maximum and minimum of entry 5 in all register files RF1-RF4, respectively, and store the results into entry 6 of RF1. Another embodiment such as "ADD, C2", or "ADD, C4" concatenates every pair or every two pairs of register file entries into a single result. The ADD instruction with qualifier "1" such as "ADD,1 R0.1, R1.5, R1.6" applies to the EX1 only. The number of the execution units and the instructions shown here are for illustration purpose. For those skilled in the art understand that the number of execution units may vary and the parallel instructions can be any kinds and the concept is still within the scope of this invention.

Figure 14:
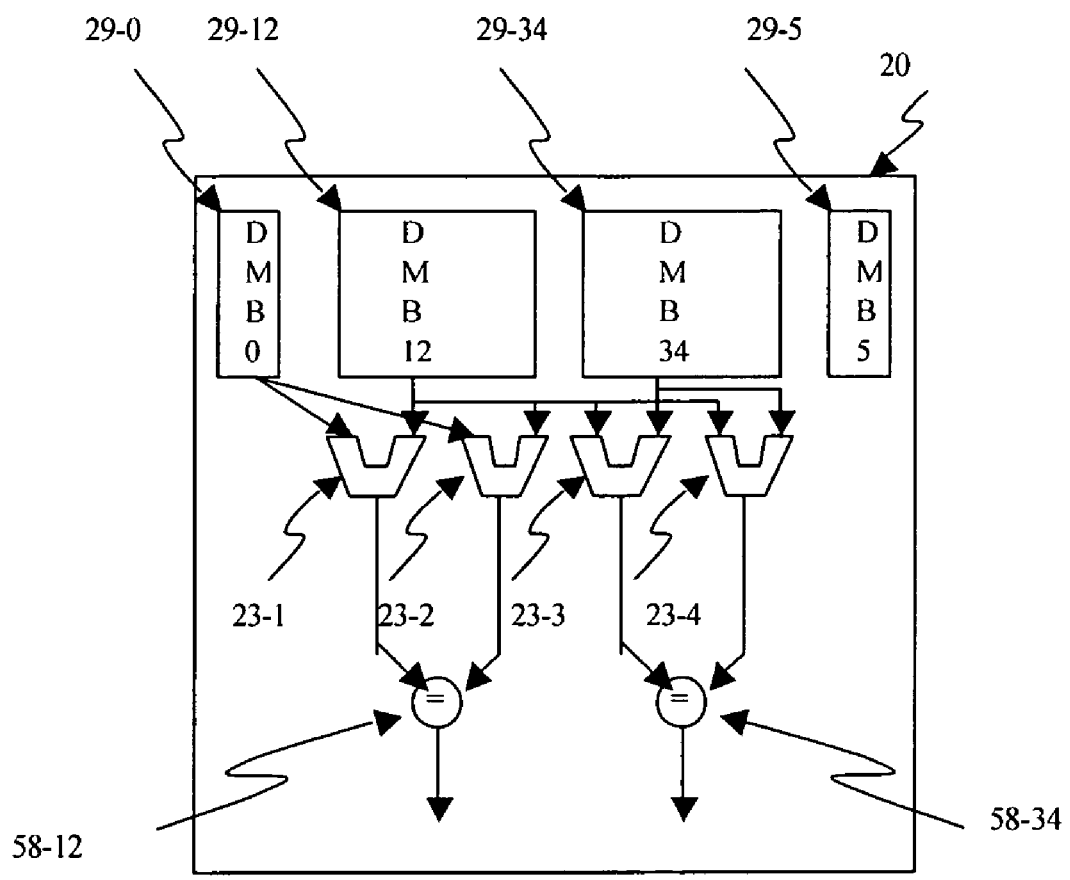
FIG. 14 shows how the instruction ADD works in a redundancy mode.

FIG. 14 shows the instruction "ADD R0.1, R1.5, R1.6" works in a redundancy mode. In the redundancy mode, two adjacent execution units work on the same input data and store the result if they are the same, otherwise flag an execution error. Since the number of execution units is essentially reduced by half, the number of DMBs is reduced by half too. The DMB 29-12 is the merge of 29-1 and 29-2 in FIG. 13(a). And the DMB 29-34 is the merge of 29-3 and 29-4. The execution units 23-1 and 23-2 works on the same input data. So do the execution units 23-3 and 23-4. The output data from 23-1 and 23-2 are compared in a comparator 58-12. The comparison outcome will enable storing execution results into register file or flagging an error, depending on 1 or 0. Similarly, the comparator 58-34 applies to the execution unit 23-3 and 24-4.

Figure 15:
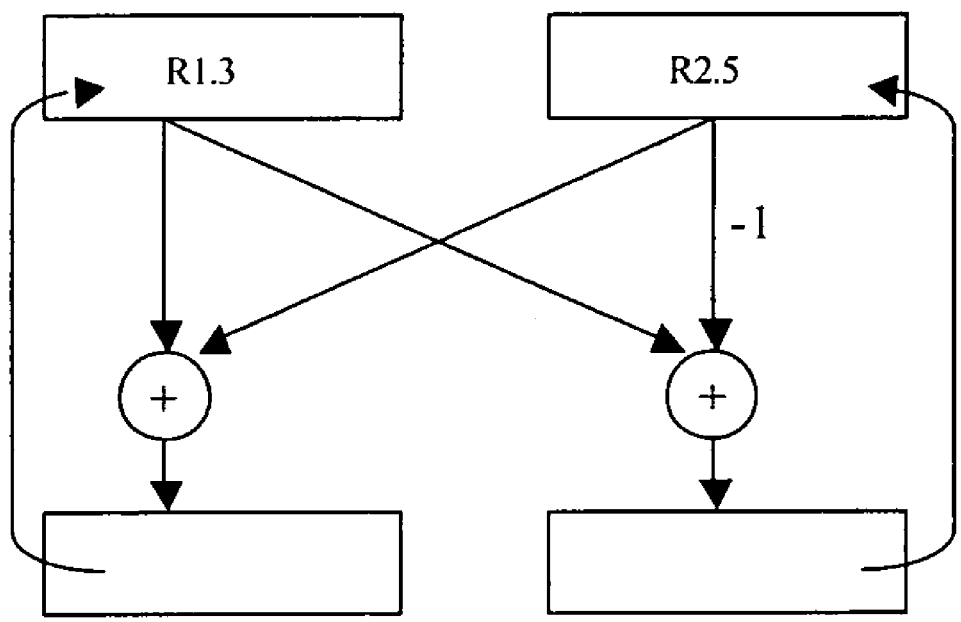
FIG. 15 shows a butterfly instruction for a pair of register file entries from two different register files.
Figure 16:
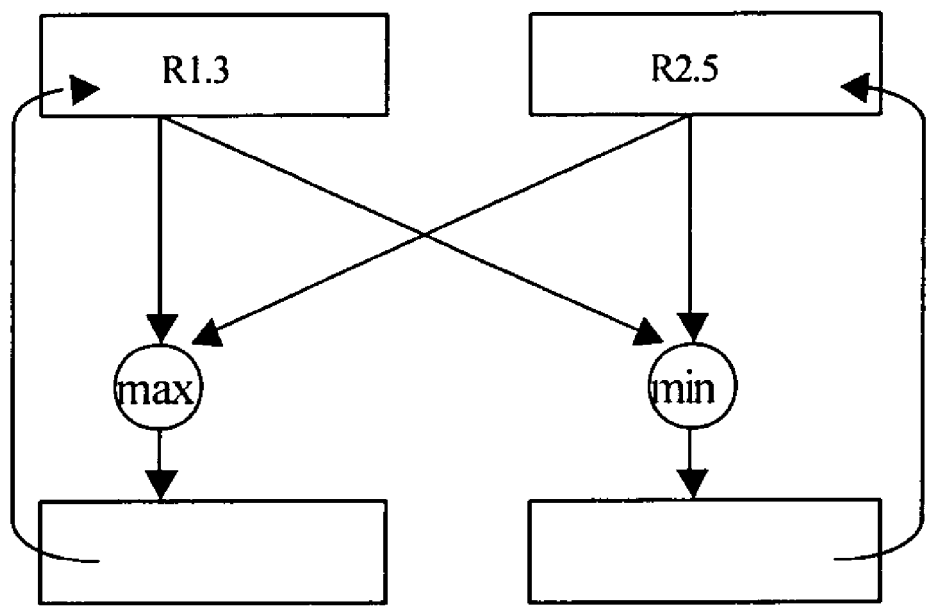
FIG. 16 shows a bionic sorting instruction for a pair of register file entries from two different register files.

FIG. 15 shows an instruction "BUF R1.3, R2.5" to generate butterfly in Fast Fourier Transform (FFT) applications. This instruction operates on a pair of execution units. The new entry 3 of each odd number RF is the entry 5 of the immediate right RF adding entry 3 of each odd number RF. And the new entry 5 of each even number RF is the entry 3 of the immediate left number RF subtracting the entry 5 of even number RF. Similarly, FIG. 16 shows a SORT instruction "SORT R1.3, R2.5" to generate bionic merge in a sorting algorithm. This instruction operates on a pair of execution units. The new entry 3 of each odd number RF is the maximum of the entry 5 of the immediate right RF or the entry 3 of the odd number RF. And the new entry 5 of each even number RF is the minimum of the entry 5 of each even number RF or the entry 3 of the immediate left RF.

Figure 17:
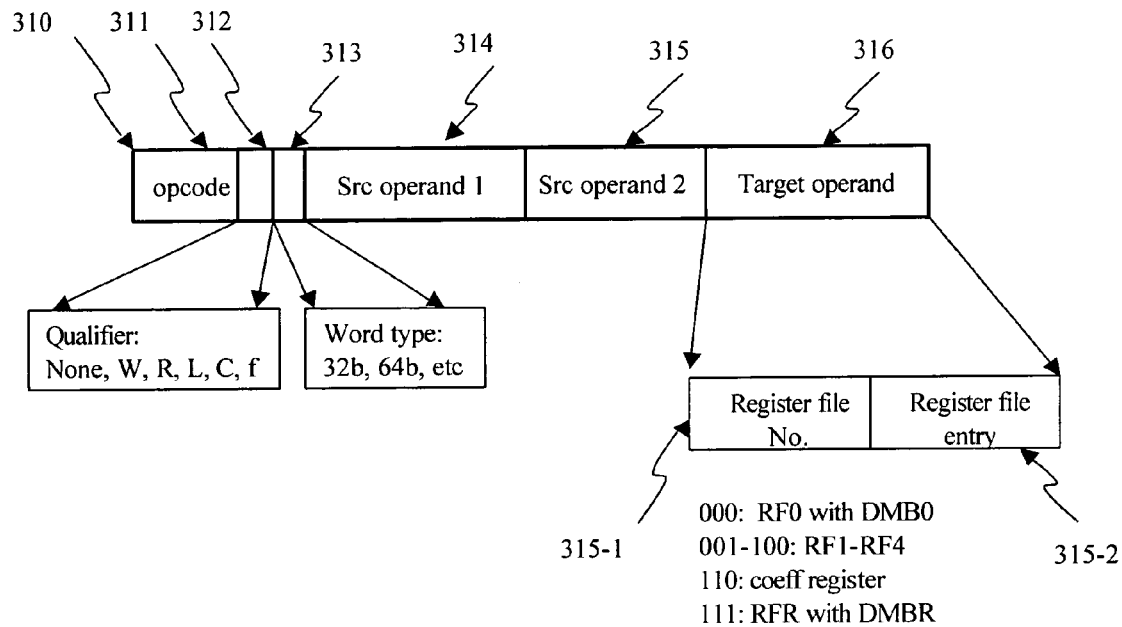
FIG. 17 shows an instruction format for execution type of instructions.

FIG. 17 shows an execution type of instruction format. 310 is the instruction format that has five fields, opcode 311, qualifier 312, word type 313, first source operand 314, second source operand 315, and the target operand 316. The qualifiers have, but are not limited to, none, W, R, L, C, 1, and f bits that can be encoded into 3 bits. Each operand has two sub-fields, register file number and entry. The entry 315-2 specifies which entry in a register file and the register file number 315-1 specifies which register file it is. The left/right register files RF0/RFR, and the coefficient registers are all assigned register file numbers. If the coefficient registers are used in the target operands, the result is undefined.

Figure 18A:
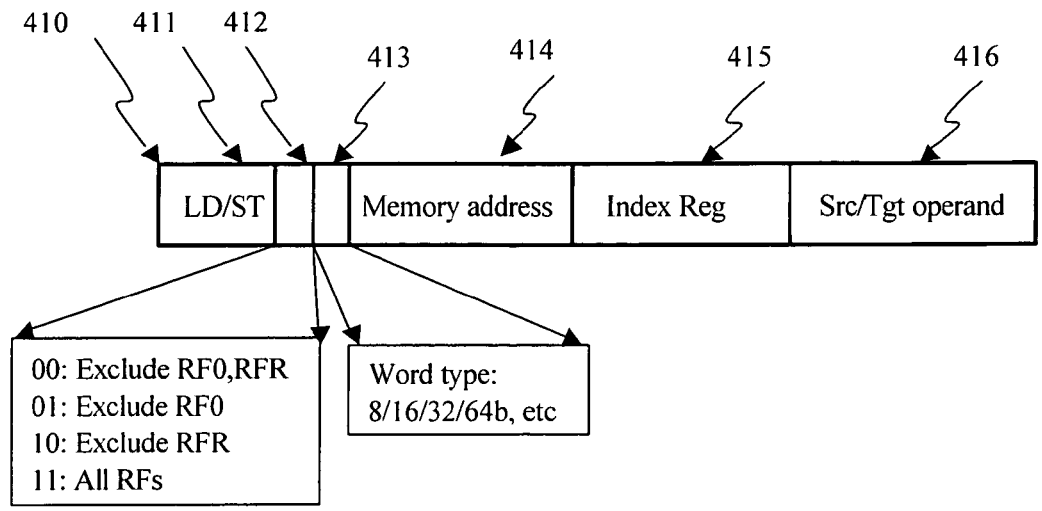
FIG. 18(a) shows a LOAD/STORE instruction using an index register as memory address offset.
Figure 18B:
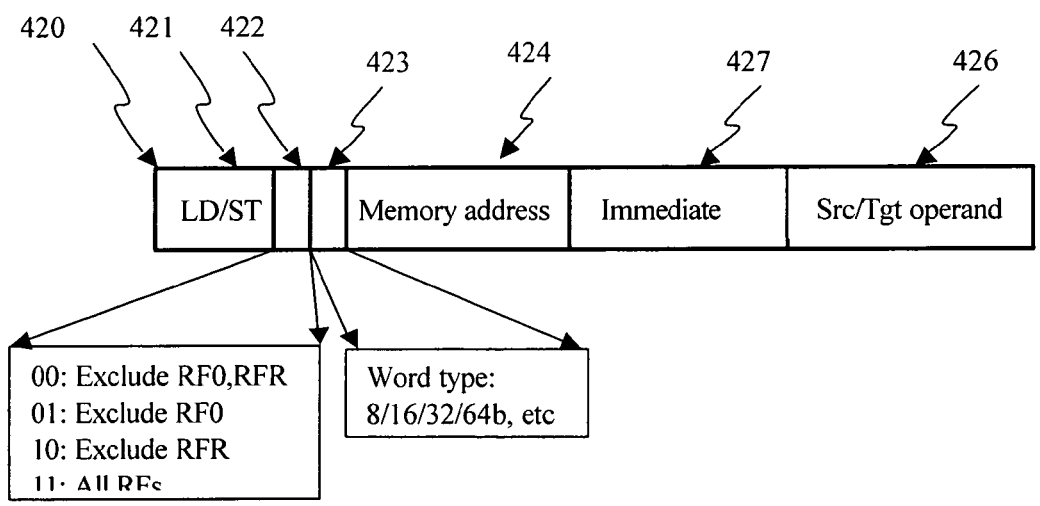
FIG. 18(b) shows a LOAD/STORE instruction using an immediate field as memory address offset.

FIG. 18(a) and (b) show the instruction format for LOAD/STORE instructions. These instructions load the data from DMBs into their respective RFs or store the data from RFs into their respective DMBs. In FIG. 18(a), the 410 is a LOAD/STORE instruction format that uses index addressing, i.e. the memory address adds the content of the index register as a new memory address for load/store. The field 411 is the opcode. The field 412 is the range of register files to be applied—those register files with execution units only or including Left, Right, or both. The field 413 is the word type, byte, half-word, word, double word, or quad word. The field 414 specifies the memory address for DMB1 only. The memory address for the other DMBs will be generated automatically with an offset. The field 415 is the index register that can be a entry of the local register files or a global register file. The field 416 is the source or target register for STORE or LOAD, respectively, that has register file number and entry. In FIG. 18(b), 420 is a LOAD/STORE instruction that uses immediate as an address offset. The fields 421, 422, 423, 424, and 426 are the opcode, register file range, word type, memory address, and source/target operand as shown in FIG. 18(a). 427 is an immediate field used as an offset to generate a new memory address.

Figure 19:
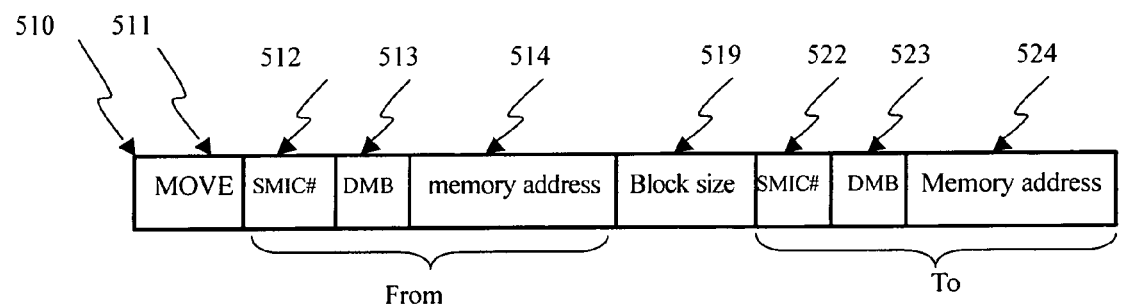
FIG. 19 shows a MOV instruction format to move data between SMICs.

FIG. 19 shows a MOV instruction format 510 for inter-SMIC data transfer. The field 511 is the opcode. The fields 512, 513, and 514 are the source SMIC number, DMB number, and the memory address, respectively. Similarly, the fields 522, 523, and 524 are the target SMIC number, DMB number, and the memory address, respectively. The field 519 is the memory block size to be transferred. Executing MOV instruction is more like a Direct Memory Access (DMA) in a conventional microprocessor that uses a single instruction for multiple cycle data transfer. A hardware state machine is responsible to generate the starting address, the ending address of the source and target SMIC respectively, and to track the number of bytes transferred.

Figure 20A:
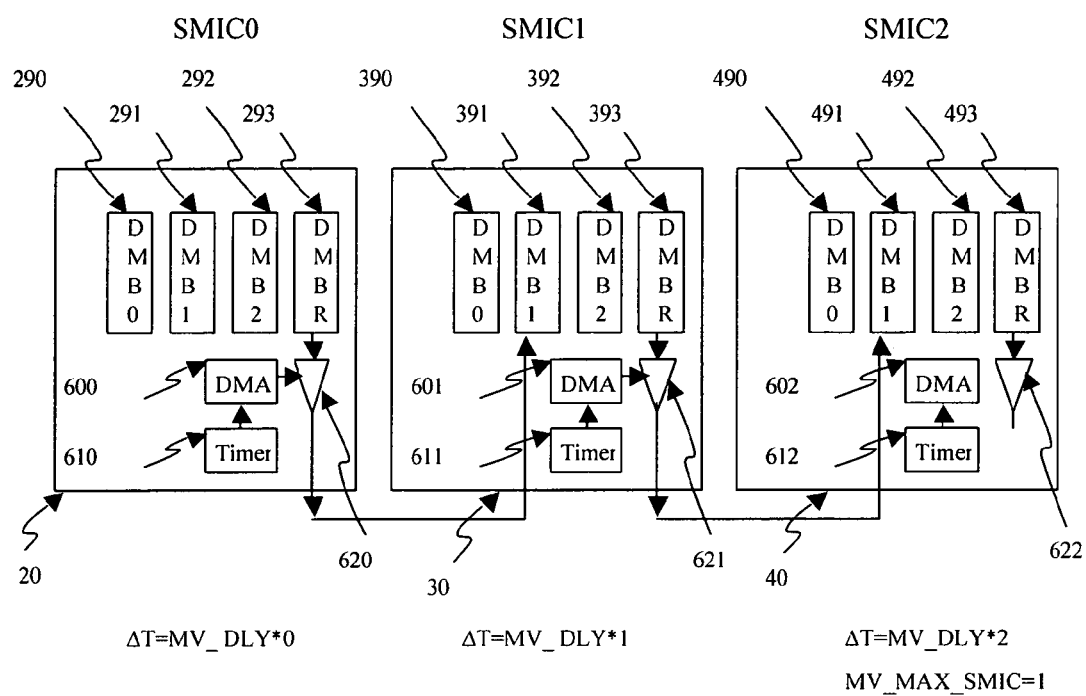
FIG. 20(a) shows pre-determined timing delay in data movement when executing a MOV instruction.

The inter-SMIC data transfers can be chained together so that one transfer finishes can fire the other one. FIG. 20(a) shows an inter-SMIC data transfer with a pre-determined timing delay. The delay cycles between executing MOV instruction and the actual data transfer is determined by a global register MV_DLY multiplied by the SMIC number. The blocks 290 through 293 are the DMB0-2 and DMBR of SMIC0. The block 600 is the transfer controller of SMIC0. The block 610 is a timer to trigger transfer operation by a global register MV_DLY multiplied by the SMIC number. The driver 620 is enabled by transfer controller output. Two DMBs are used as an example to show the concept of inter-SMIC data transfer. For those skilled in the art understand that the actual number may vary and the concept still falls within the scope of this invention. The blocks 30 and 40 are SMIC1 and SMIC2, respectively. The naming convention of the blocks within SMIC1 and SMIC2 follows the same way as SMIC0. Because of different SMIC numbers, the first SMIC device, SMIC0, is triggered immediately after MOV instruction is executed. But the second SMIC device, SMIC1, is triggered MV_DLY*1 cycles later. Similarly, the third SMIC device, SMIC2, is triggered MV_DLY*2 cycles after MOV instruction is executed. Triggering block transfer is controlled by a global register MV_MAX_SMIC. Once the device number is larger than MV_MAX_SMIC, the block transfer is not triggered.

Figure 20B:
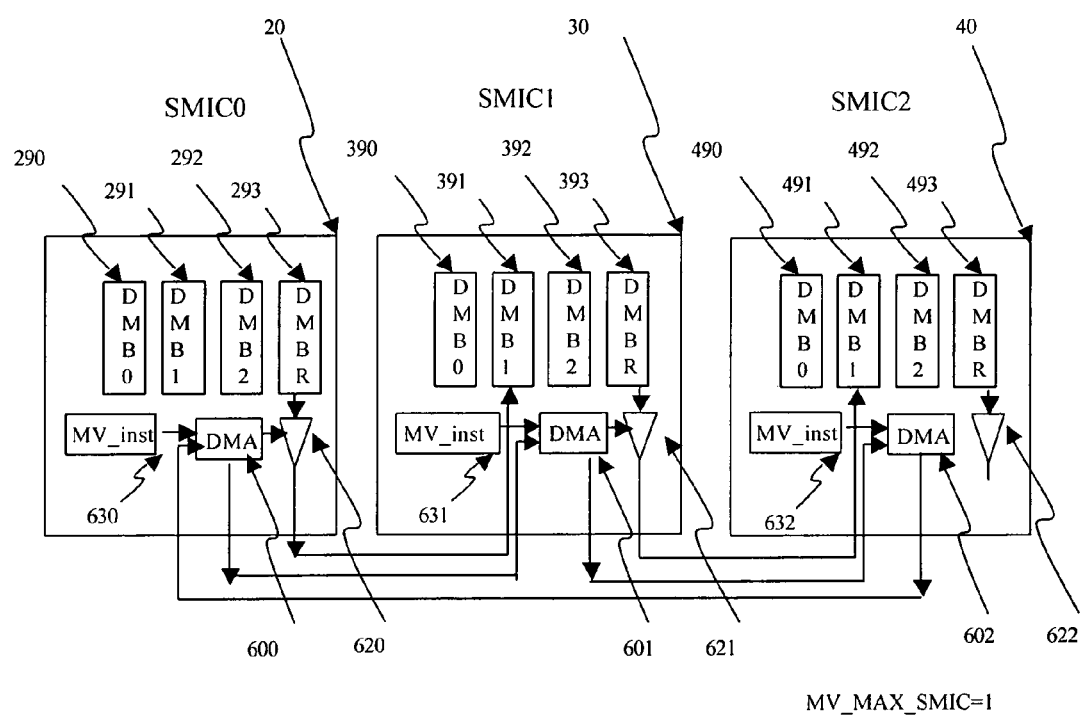
FIG. 20(b) shows an event trigger in data movement when executing a MOV instruction.

FIG. 20(b) shows another block transfer triggering mechanism based on event, rather than on a pre-determined timing. The blocks 630, 631, and 632 are signals generated after the MOV instruction is executed. The first DMA 600 is triggered immediately. But the second DMA 601 waits until the DMA 600 finishes its job. Similarly, the third DMA 602 waits until the DMA 602 finishes its job. The third DMA generates a signal to the first DMA indicating the end of the inter-SMIC transfer in a round robin fashion. The DMA 602 does not enable any further data transfer but just sends an ending signal to the first SMIC.

The advantage of DMA-like of operation for inter-SMIC data movement is (1) a single instruction can result in a block of data transfer; and (2) the data movement can overlap with the parallel executions. The target of the transfer is usually set to either DMB0 or DMBR as a buffer so that the normal parallel execution will not be interrupted. Once the inter-SMIC data transfer is completed, a bit "L/R" in a global control register can be set so that the role of DMB0 and DMBR; RF0 and RFR, can be reversed to continue another round of parallel executions without any code changes.

The invention of the smart memory computing system utilized a memory system having processing capabilities in additional to data storage. Therefore, the SMICs behave like a multiple-functional unit CPU with integrated memory. Moreover, the smart memory sub-system also has the bus master capabilities to interrupt CPU and to request bus ownership. The general computing concepts such as type and number of execution units, instruction decoder, register files, scratch pad RAM, data memories, pipeline, status and control registers, exception and interrupt can be applied to the smart memory computing system without loss the scope of this invention.

The invention is preferably implemented electronic circuitry, but can be implemented by electronic circuitry in combination with software. Such software can be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A smart memory computing system, comprising:
a user space wherein data within has data-level parallelism;
a smart memory having multiple execution units wherein data can be processed in parallel and in situ;
a graphical representation describing data in said user space and interactions therewith; and
a compiler mapping data from said user space to said smart memory space and generating executable codes in accordance with said graphical representation,
wherein said graphical representation comprises:
objects containing said data within the said user space;
object boundary conditions containing boundaries between objects or between objects and a boundary of said user space; and
equations governing interactions between said data within the said user space, and
wherein said boundary conditions are specified as fixed values for variables, fixed values for derivatives of variables, equations containing arithmetic expressions of the variables and their derivatives, or combinations of the above.

2. A smart memory computing system, comprising:
a user space wherein data within has data-level parallelism;
a smart memory having multiple execution units wherein data can be processed in parallel and in situ;
a graphical representation describing data in said user space and interactions therewith; and
a compiler mapping data from said user space to said smart memory space and generating executable codes in accordance with said graphical representation,
wherein said graphical representation comprises:
objects containing said data within the said user space;
objects boundary conditions containing boundaries between objects or between objects and a boundary of said user space; and
equations governing interactions between said data within the said user space, and
wherein said compiler generates codes for said parallel processing based on:
accepting outputs from said graphical representation to obtain said objects, said boundary conditions, and said equations;
mapping data within said user space to the data within said smart memory space; and
applying a parallel instruction set to processing data within the said smart memory space.

3. The smart memory computing system as recited in claim 2, wherein said mapping preserves the physical location of the data in said user space to said data in the said smart memory space.

4. The smart memory computing system as recited in claim 2, wherein said parallel instruction set allows a single instruction code to be applied to P processors for processing data in the said smart memory space in parallel, wherein said P processors are indexed numerically.

5. The smart memory computing system as recited in claim 4, wherein said instruction code comprises fields of input operands from a multiple-port register file associated with each said processors, wherein said register files are indexed numerically.

6. The smart memory computing system as recited in claim 4, wherein said instruction code comprises fields of input operands from a common multiple-port register file not associated with any said P processors.

7. The smart memory computing system as recited in claim 4, wherein said instruction code comprises fields of input operands from processor-associated multiple-port register files, wherein said register files are indexed with a fixed offset to said processors.

8. The smart memory computing system as recited in claim 4, wherein said instruction code comprises fields of input operands from processor-associated multiple-port register files, wherein said register files are indexed in circular to said processors.

9. The smart memory computing system as recited in claim 4, wherein said instruction code comprises fields of input operands from processor-associated multiple-port register files, wherein said register files are input from all P processors to generate a single result.

* * * * *